United States Patent
Bhattad et al.

(10) Patent No.: US 11,445,539 B2
(45) Date of Patent: Sep. 13, 2022

(54) HANDLING GAPS IN UPLINK TRANSMISSION IN NEW RADIO UNLICENSED

(71) Applicant: QUALCOMM Incorporated, San Diego, CA (US)

(72) Inventors: Kapil Bhattad, Bangalore (IN); Tanumay Datta, Bangalore (IN); Pravjyot Singh Deogun, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/915,686

(22) Filed: Jun. 29, 2020

(65) Prior Publication Data

US 2021/0007128 A1 Jan. 7, 2021

(30) Foreign Application Priority Data

Jul. 2, 2019 (IN) .............................. 201941026406

(51) Int. Cl.
*H04W 72/14* (2009.01)
*H04W 72/12* (2009.01)
(Continued)

(52) U.S. Cl.
CPC ........... *H04W 72/14* (2013.01); *H04L 1/0008* (2013.01); *H04L 5/0082* (2013.01); *H04W 16/14* (2013.01);
(Continued)

(58) Field of Classification Search
CPC . H04W 72/14; H04W 16/14; H04W 28/0278; H04W 72/1268; H04W 74/0808; H04L 1/0008; H04L 5/0082
See application file for complete search history.

(56) References Cited

U.S. PATENT DOCUMENTS

2017/0280475 A1* 9/2017 Yerramalli ........ H04W 28/0278

OTHER PUBLICATIONS

Qualcomm Incorporated: "UL signals and channels for NR-U", S3GPP Draft; R1-1904998 7.2.2.1.3 UL Signals and Channels for NR-U, 3rd Generation Partnership Project (3GPP), Mobile Competence Centre; 650,Route Des Lucioles ; F-06921 Sophia-Antipolis Cedex ; France, vol. RAN WG, No. Xi'an, China; Apr. 8, 2019-Apr. 12, 2019 7.*

(Continued)

*Primary Examiner* — Kevin C. Harper
*Assistant Examiner* — Henry Baron
(74) *Attorney, Agent, or Firm* — Holland & Hart LLP/Qualcomm

(57) ABSTRACT

Methods, systems, and devices for wireless communications are described. A user equipment (UE) may receive a set of one or more uplink grants scheduling at least a first uplink transmission and a second uplink transmission during a channel occupancy time of an unlicensed radio frequency spectrum band. The UE may identify a transmission gap between the first uplink transmission and the second uplink transmission of the plurality of uplink transmissions by the UE during the channel occupancy time, the transmission gap exceeding a threshold time. The UE may determine that the transmission gap corresponds to a lost uplink grant. The UE may modify the first uplink transmission or the second uplink transmission based at least in part on the determination that the transmission gap corresponds to the lost uplink grant.

16 Claims, 14 Drawing Sheets

(51) Int. Cl.
　　　*H04W 74/08*　　　(2009.01)
　　　*H04L 5/00*　　　 (2006.01)
　　　*H04W 16/14*　　　(2009.01)
　　　*H04L 1/00*　　　 (2006.01)
　　　*H04W 28/02*　　　(2009.01)

(52) U.S. Cl.
　　　CPC ... *H04W 28/0278* (2013.01); *H04W 72/1268* (2013.01); *H04W 74/0808* (2013.01)

(56) References Cited

OTHER PUBLICATIONS

International Search Report and Written Opinion—PCT/US2020/040347—ISAEPO—dated Sep. 3, 2020.
Qualcomm Incorporated: "UL Signals and Channels for NR-U", 3GPP Draft, 3GPP TSG RAN WG1 Meeting #96bis, R1-1904998 7.2.2.1.3 UL Signals and Channels for NR-U, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Apr. 7, 2019 (Apr. 7, 2019), XP051700113, 17 pages, Retrieved from the Internet: URL: http://www.3gpp.org/ftp/Meetings%5F3GPP%5FSYNC/RAN1/Docs/R1%2D1904998%2Ezip, [retrieved on Apr. 7, 2019], Sections 1-6.

* cited by examiner

HANDLING GAPS IN UPLINK TRANSMISSION IN NEW RADIO UNLICENSED

CROSS REFERENCE

The present Application for Patent claims the benefit of India Provisional Patent Application No. 201941026406 by BHATTAD et al., entitled "HANDLING GAPS IN UPLINK TRANSMISSION IN NEW RADIO UNLICENSED," filed Jul. 2, 2019, assigned to the assignee hereof, and expressly incorporated by reference herein.

BACKGROUND

The following relates generally to wireless communications, and more specifically to handling gaps in uplink transmission in new radio unlicensed (NR-U).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support handling gaps in uplink transmission in new radio unlicensed (NR-U). Generally, the described techniques provide various mechanisms that support handling a lost uplink grant resulting in a transmission gap during a channel occupancy time (COT). Aspects of the described techniques may include a user equipment (UE) that receives uplink grants scheduling uplink transmissions during the COT. The uplink grants may be received over a shared or unlicensed radio frequency spectrum band. The UE may identify or otherwise determine that there is a transmission gap that exceeds a threshold between uplink transmissions during the COT. The UE may determine that the transmission gap is based, at least in some aspects, on a lost uplink grant. In one example, the UE may identify the lost uplink grant based on burst identifiers for the scheduled uplink transmissions. In another example, the UE may identify the lost uplink grant based on a slot format indicator (SFI) (e.g., a transmission direction configured for the transmission gap) in combination with the allocation of the UE received in the received uplink grant. Accordingly, the UE may modify one or more of its uplink transmissions during the COT based on the lost uplink grant. For example, the UE may drop one or more uplink transmissions, perform/modify/drop a listen-before-talk (LBT) for one or more uplink transmissions, and the like.

Additionally or alternatively, the UE may detect or otherwise determine a transmission gap within a plurality of transmission time intervals (TTIs). That is, the UE may receive an uplink grant scheduling a plurality of uplink transmissions during the plurality of TTIs. In some aspects, the uplink grant may correspond to a configured uplink grant. However, the UE may determine that it has no information to communicate during one or more of the uplink transmissions, e.g., based on the uplink grant and/or an uplink buffer status of the UE. This may result in a transmission gap in the plurality of TTIs detected by the UE. Accordingly, the UE may modify one or more of the uplink transmissions and perform the uplink transmissions according to the uplink grant and based on the modifying. For example, the UE may add padding bits to some or all of the uplink transmissions in the transmission gap, may skip the uplink transmission in the transmission gap, may reorder the uplink transmissions, and the like. Accordingly, the UE may detect the transmission gap and transmissions accordingly to address the gaps.

A method of wireless communication at a UE is described. The method may include receiving a set of one or more uplink grants scheduling at least a first uplink transmission and a second uplink transmission during a channel occupancy time of an unlicensed radio frequency spectrum band, identifying a transmission gap between the first uplink transmission and the second uplink transmission of the set of uplink transmissions by the UE during the channel occupancy time, the transmission gap exceeding a threshold time, determining that the transmission gap corresponds to a lost uplink grant, and modifying the first uplink transmission or the second uplink transmission based on the determination that the transmission gap corresponds to the lost uplink grant.

An apparatus for wireless communication at a UE is described. The apparatus may include a processor, memory coupled with the processor, and instructions stored in the memory. The instructions may be executable by the processor to cause the apparatus to receive a set of one or more uplink grants scheduling at least a first uplink transmission and a second uplink transmission during a channel occupancy time of an unlicensed radio frequency spectrum band, identify a transmission gap between the first uplink transmission and the second uplink transmission of the set of uplink transmissions by the UE during the channel occupancy time, the transmission gap exceeding a threshold time, determine that the transmission gap corresponds to a lost uplink grant, and modify the first uplink transmission or the second uplink transmission based on the determination that the transmission gap corresponds to the lost uplink grant.

Another apparatus for wireless communication at a UE is described. The apparatus may include means for receiving a set of one or more uplink grants scheduling at least a first uplink transmission and a second uplink transmission during a channel occupancy time of an unlicensed radio frequency spectrum band, identifying a transmission gap between the first uplink transmission and the second uplink transmission of the set of uplink transmissions by the UE during the channel occupancy time, the transmission gap exceeding a threshold time, determining that the transmission gap corresponds to a lost uplink grant, and modifying the first uplink transmission or the second uplink transmission based on the determination that the transmission gap corresponds to the lost uplink grant.

A non-transitory computer-readable medium storing code for wireless communication at a UE is described. The code may include instructions executable by a processor to receive a set of one or more uplink grants scheduling at least a first uplink transmission and a second uplink transmission during a channel occupancy time of an unlicensed radio frequency spectrum band, identify a transmission gap between the first uplink transmission and the second uplink transmission of the set of uplink transmissions by the UE during the channel occupancy time, the transmission gap exceeding a threshold time, determine that the transmission gap corresponds to a lost uplink grant, and modify the first uplink transmission or the second uplink transmission based on the determination that the transmission gap corresponds to the lost uplink grant.

Some examples of the method, apparatuses, and non-transitory computer-readable medium described herein may further include operations, features, means, or instructions for determining a first burst identifier of the first uplink transmission and a second burst identifier of the second uplink transmission, where determining that the transmission gap corresponds to the lost uplink grant may be based on the first burst identifier and the second burst identifier.

Some examples of the method, apparatuses, and non-transitory computer-readable medium described herein may further include operations, features, means, or instructions for determining a transmission direction configured for the transmission gap, where determining that the transmission gap corresponds to the lost uplink grant may be based on the transmission direction.

In some examples of the method, apparatuses, and non-transitory computer-readable medium described herein, the transmission direction configured for the transmission gap may be based on a slot format indicator.

In some examples of the method, apparatuses, and non-transitory computer-readable medium described herein, modifying the first uplink transmission or the second uplink transmission may include operations, features, means, or instructions for dropping the first uplink transmission or the second uplink transmission based on a length of the first uplink transmission or the second uplink transmission.

In some examples of the method, apparatuses, and non-transitory computer-readable medium described herein, modifying the first uplink transmission or the second uplink transmission may include operations, features, means, or instructions for dropping the first uplink transmission or the second uplink transmission based on a transmission time of the first uplink transmission or the second uplink transmission.

In some examples of the method, apparatuses, and non-transitory computer-readable medium described herein, modifying the first uplink transmission or the second uplink transmission may include operations, features, means, or instructions for performing a LBT procedure in connection with one or more of the first uplink transmission, or the second uplink transmission, or a combination thereof, based on the transmission gap.

In some examples of the method, apparatuses, and non-transitory computer-readable medium described herein, modifying the first uplink transmission or the second uplink transmission further may include operations, features, means, or instructions for dropping the first uplink transmission or the second uplink transmission based on a result of a LBT procedure.

In some examples of the method, apparatuses, and non-transitory computer-readable medium described herein, modifying the first uplink transmission or the second uplink transmission may include operations, features, means, or instructions for modifying a LBT procedure performed before at least one of the first uplink transmission, or the second uplink transmission, or a combination thereof, based on the transmission gap.

A method of wireless communication at a UE is described. The method may include receiving an uplink grant scheduling a set of uplink transmissions during a set of TTIs in an unlicensed radio frequency spectrum band, modifying one or more uplink transmissions of the set of uplink transmissions based on the uplink grant, and performing the set of uplink transmissions based on the uplink grant and the modifying.

An apparatus for wireless communication at a UE is described. The apparatus may include a processor, memory coupled with the processor, and instructions stored in the memory. The instructions may be executable by the processor to cause the apparatus to receive an uplink grant scheduling a set of uplink transmissions during a set of TTIs in an unlicensed radio frequency spectrum band, modify one or more uplink transmissions of the set of uplink transmissions based on the uplink grant, and perform the set of uplink transmissions based on the uplink grant and the modifying.

Another apparatus for wireless communication at a UE is described. The apparatus may include means for receiving an uplink grant scheduling a set of uplink transmissions during a set of TTIs in an unlicensed radio frequency spectrum band, modifying one or more uplink transmissions of the set of uplink transmissions based on the uplink grant, and performing the set of uplink transmissions based on the uplink grant and the modifying.

A non-transitory computer-readable medium storing code for wireless communication at a UE is described. The code may include instructions executable by a processor to receive an uplink grant scheduling a set of uplink transmissions during a set of TTIs in an unlicensed radio frequency spectrum band, modify one or more uplink transmissions of the set of uplink transmissions based on the uplink grant, and perform the set of uplink transmissions based on the uplink grant and the modifying.

In some examples of the method, apparatuses, and non-transitory computer-readable medium described herein, modifying the one or more uplink transmissions may include operations, features, means, or instructions for adding padding bits to a subset of the set uplink transmissions that for which no data is available.

In some examples of the method, apparatuses, and non-transitory computer-readable medium described herein, modifying the one or more uplink transmissions may include operations, features, means, or instructions for adding padding bits to each of the set uplink transmissions that may be associated with the an empty uplink buffer status.

In some examples of the method, apparatuses, and non-transitory computer-readable medium described herein, modifying the one or more uplink transmissions may include operations, features, means, or instructions for determining, based on the uplink grant, that the set of uplink transmissions may be configured for skipping, and skipping the uplink transmissions that may be associated with the transmission gap.

In some examples of the method, apparatuses, and non-transitory computer-readable medium described herein, modifying the one or more uplink transmissions may include operations, features, means, or instructions for reordering, based on the uplink grant, the set of uplink transmission.

In some examples of the method, apparatuses, and non-transitory computer-readable medium described herein, modifying the one or more uplink transmissions may include operations, features, means, or instructions for detecting, based at least in part on the uplink grant and an uplink buffer status, a transmission gap associated with a lost uplink grant in the plurality of TTIs, performing a full LBT procedure before an uplink transmission following the transmission gap based on the determination that the transmission gap corresponds to the lost uplink grant.

In some examples of the method, apparatuses, and non-transitory computer-readable medium described herein, modifying the one or more uplink transmissions may include operations, features, means, or instructions for detecting, based at least in part on the uplink grant and an uplink buffer status, a transmission gap in the plurality of TTIs, determining that a duration of the transmission gap may be within a threshold range, and performing, based on the duration being within the threshold range, a short LBT procedure before an uplink transmission following the transmission gap.

In some examples of the method, apparatuses, and non-transitory computer-readable medium described herein, modifying the one or more uplink transmissions may include operations, features, means, or instructions for detecting, based at least in part on the uplink grant and an uplink buffer status, a transmission gap in the plurality of TTIs, and performing a short LBT procedure before an uplink transmission following the transmission gap based on the uplink grant configuring the short LBT procedure or on the uplink transmission being performed during the channel occupancy time associated with the set of TTIs.

DETAILED DESCRIPTION

Figure 1:
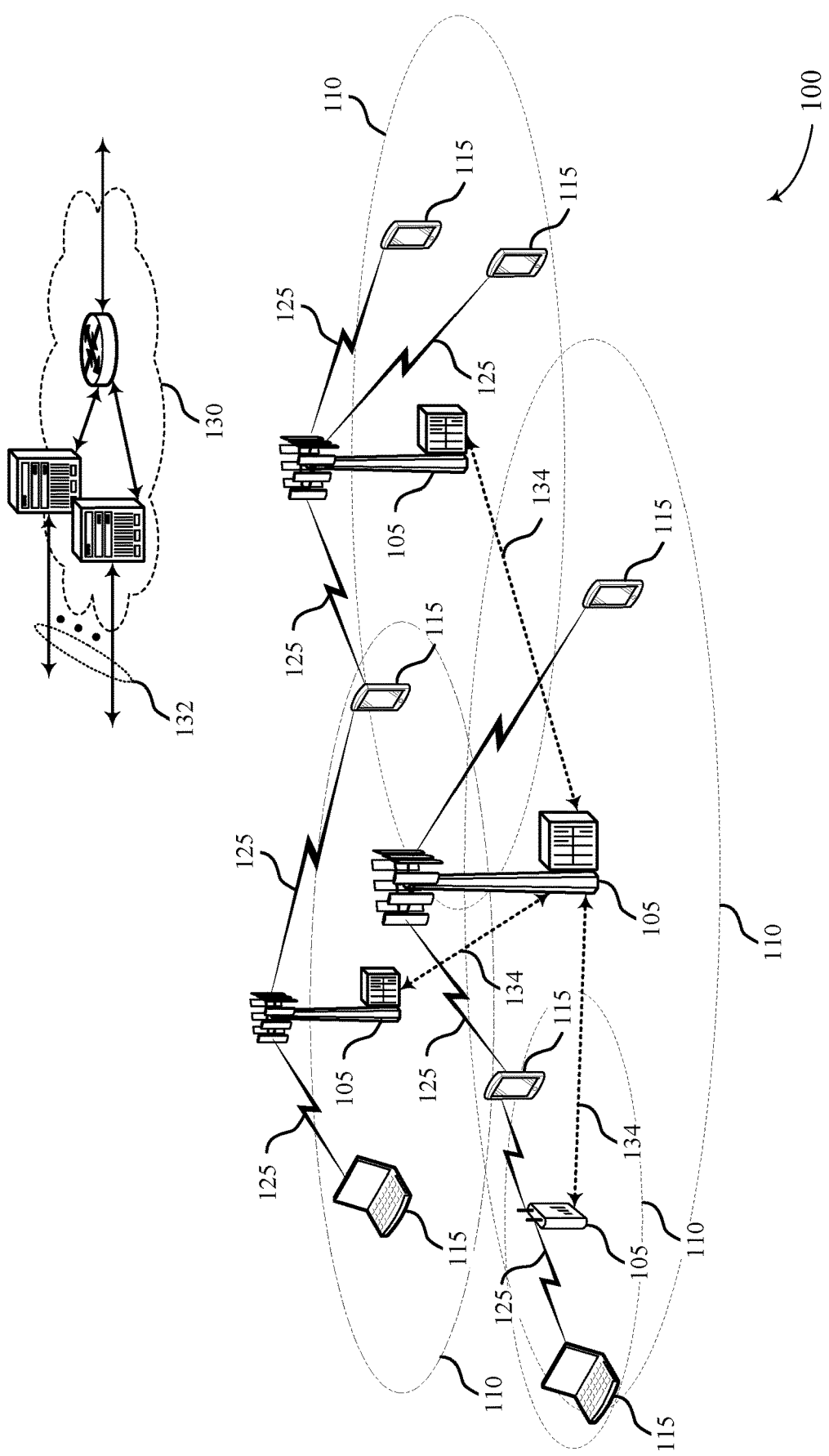
FIG. 1 illustrates an example of a system for wireless communications that supports handling gaps in uplink transmission in new radio unlicensed (NR-U) in accordance with aspects of the present disclosure.

Wireless communication systems may operate in a shared or unlicensed radio frequency spectrum band. Operations in a shared or unlicensed radio frequency band typically require the wireless devices to perform a channel access procedure, which may also be referred to as a listen-before-talk (LBT) procedure, a clear channel assessment (CCA) procedure, and the like. Generally, the LBT procedure may include the wireless device monitoring the channel for a time period (e.g., that depends on whether the LBT procedure is a one-shot LBT procedure, a full LBT procedure, and the like) to determine whether the channel is occupied or available for capture.

Aspects of the disclosure are initially described in the context of a wireless communications system, such as a network operating in a shared or unlicensed radio frequency spectrum band. Aspects of the described techniques may include a user equipment (UE) that receives uplink grants scheduling uplink transmissions during the channel occupancy time (COT). The uplink grants may be received over the shared or unlicensed radio frequency spectrum band. The UE may identify or otherwise determine that there is a transmission gap that exceeds a threshold between scheduled uplink transmissions during the COT. The UE may determine that the transmission gap is based, at least in some aspects, on a lost uplink grant. A lost uplink grant refers to a grant that is transmitted by the base station, but is not received at the UE. In one example, the UE may identify the lost uplink grant based on burst identifiers for the scheduled uplink transmissions. In another example, the UE may identify the lost uplink grant based on a slot format indicator (SFI) (e.g., a transmission direction configured for the transmission gap) in combination with the allocation of the UE received in the received uplink grant. Accordingly, the UE may modify one or more of its uplink transmissions during the COT based on the lost uplink grant. For example, the UE may drop one or more uplink transmissions, perform/modify/drop a LBT for one or more uplink transmissions, and the like.

Additionally or alternatively, the UE may detect or otherwise determine a transmission gap within a plurality of transmission time intervals (TTIs). That is, the UE may receive an uplink grant scheduling a plurality of uplink transmissions during the plurality of TTIs. However, the UE may determine that it has no information to communicate during one or more of the uplink transmissions, e.g., based on the uplink grant and/or an uplink buffer status of the UE. This may result in a transmission gap in the plurality of TTIs detected by the UE. Accordingly, the UE may modify one or more of the uplink transmissions and perform the uplink transmissions according to the uplink grant and based on the modifying. For example, the UE may add padding bits to some or all of the uplink transmissions in the transmission gap, may skip the uplink transmission in the transmission gap, may reorder the uplink transmissions, and the like. Accordingly, the UE may detect the transmission gap and transmissions accordingly to address the gaps.

Aspects of the disclosure are further illustrated by and described with reference to apparatus diagrams, system diagrams, and flowcharts that relate to handling gaps in uplink transmission in NR-U.

FIG. 1 illustrates an example of a wireless communications system 100 that supports handling gaps in uplink transmission in NR-U in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may receive a set of one or more uplink grants scheduling at least a first uplink transmission and a second uplink transmission during a channel occupancy time of an unlicensed radio frequency spectrum band. The UE 115 may identify a transmission gap between the first uplink transmission and the second uplink transmission of the plurality of uplink transmissions by the UE during the channel occupancy time, the transmission gap exceeding a threshold time. The UE 115 may determine that the transmission gap corresponds to a lost uplink grant. The UE 115 may modify the first uplink transmission or the second uplink transmission based at least in part on the determination that the transmission gap corresponds to the lost uplink grant.

In some aspects, a UE 115 may receive an uplink grant scheduling a plurality of uplink transmissions during a plurality of TTIs in an unlicensed radio frequency spectrum band. The UE 115 may detect, based at least in part on the uplink grant and an uplink buffer status, a transmission gap in the plurality of TTIs. The UE 115 may modify one or more uplink transmissions of the plurality of uplink transmissions based at least in part on the detected transmission gap. The UE 115 may perform the plurality of uplink transmissions based at least in part on the uplink grant and the modifying.

Figure 2A:
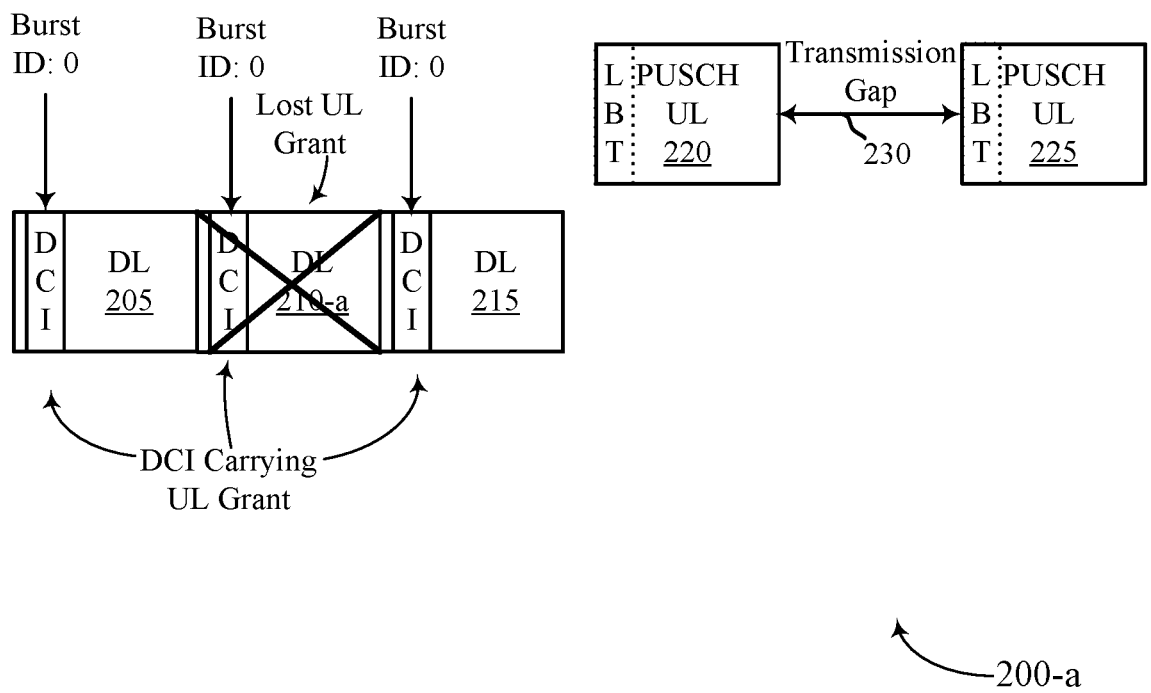
FIGS. 2A and 2B illustrate examples of a transmission configuration that supports handling gaps in uplink transmission in NR-U in accordance with aspects of the present disclosure.
Figure 2B:
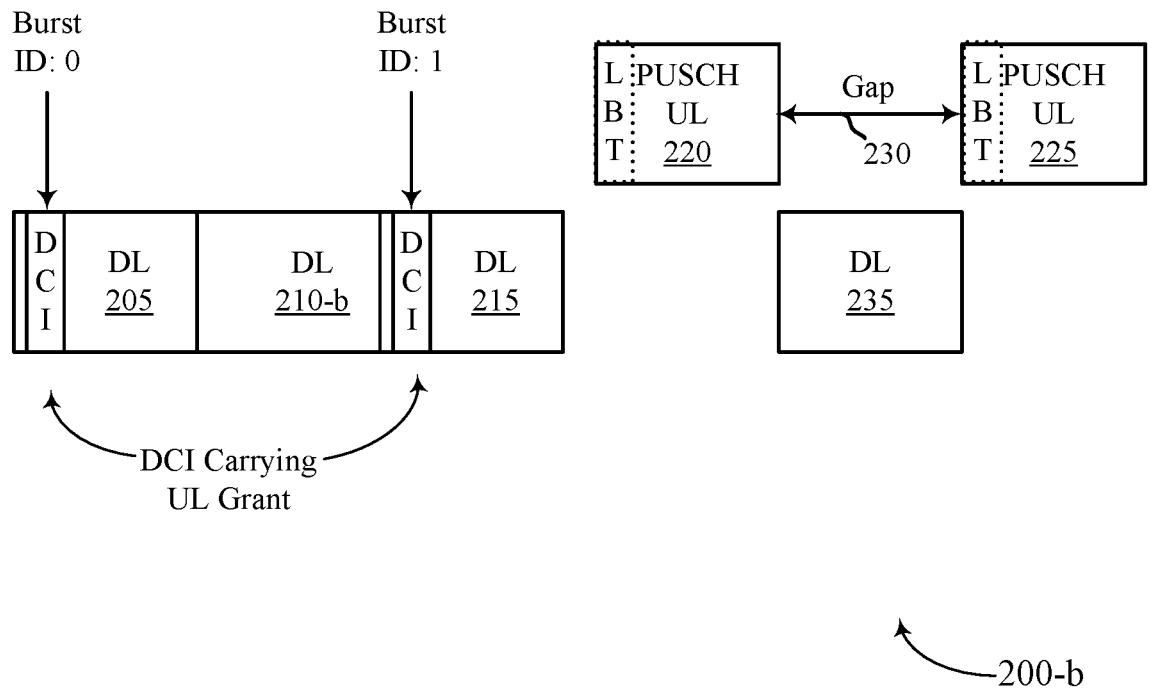

FIGS. 2A and 2B illustrate examples of a transmission configuration 200 that supports handling gaps in uplink transmission in NR-U in accordance with aspects of the present disclosure. In some examples, transmission configuration 200 may implement aspects of wireless communications system 100. Aspects of transmission configuration 200 may be implemented by a base station and/or a UE, which may be examples of the corresponding devices described herein. Generally, FIG. 2A illustrates an example where a UE determines that a transmission gap corresponds to a lost uplink grant and FIG. 2B illustrate an example where a UE determines that the transmission gap corresponds to a downlink transmission.

In some aspects, wireless devices (e.g., base station and UE) may operate in a shared or unlicensed radio frequency spectrum band. Operations in a shared or unlicensed radio frequency band typically require the wireless devices to perform a channel access procedure, which may also be referred to as a LBT procedure, a CCA procedure, and the like. Generally, the LBT procedure may include the wireless device monitoring the channel for a time period, e.g., that depends on whether the LBT procedure is a one-shot LBT procedure (a category four LBT procedure, CAT-4), a full LBT procedure (a category two LBT procedure, CAT-2), and the like, to determine whether the channel is occupied or available for capture.

If the LBT procedure is successful (e.g., the channel is available), the initiating device (e.g., the device performing the LBT procedure) may capture the channel for a COT in which to perform wireless communications (e.g., uplink and/or downlink communications). However, there may be a limit to the gap time between subsequent uplink/downlink transmissions performed by the UE/base station, respectively, during the COT. For example, gaps of more than 16 micro seconds within subsequent UE uplink transmissions may not be allowed. There may be a downlink transmission between the subsequent uplink transmissions, but not a transmission gap between the subsequent uplink transmissions that exceeds the threshold time. Moreover, there may not be an uplink transmission from a different UE between subsequent uplink transmissions from the first UE.

In some aspects, there may be a situation where transmission gaps occur in uplink transmissions from a UE if the UE misses an uplink grant between back-to-back uplink grants, e.g., if there is a lost uplink grant. In this situation, the UE is conventionally not aware of whether the transmission gap is due to the lost uplink grant or if there is a downlink transmission being performed between the subsequent uplink UE transmissions.

Accordingly, aspects of the described techniques provide various mechanisms that support the UE determining whether the transmission gap exceeding the threshold time is due to a lost grant or are due to a downlink transmission occurring during the transmission gap. Broadly, the described techniques may utilize a burst identifier (ID) and/or a slot format indicator (SFI) plus the UE allocation to help the UE to determine whether the transmission gap is due to a lost uplink grant or to a downlink transmission.

The UE may receive a set of one or more uplink grants scheduling corresponding uplink transmissions during a channel occupancy time. The uplink grants may be received over a shared or unlicensed radio frequency spectrum band. For example, the UE may receive a first uplink grant in downlink transmission 205 and a second uplink grant in downlink transmission 215. In some aspects, each uplink grant may be carried or otherwise conveyed in the corresponding DCI of the downlink transmissions. However, the UE may miss downlink transmission 210 due to interference, blockage, etc., such that the UE misses the uplink grant conveyed in the DCI of downlink transmission 210-a.

Generally, the first uplink grant in the DCI of downlink transmission 205 may schedule a corresponding first uplink transmission 220 (e.g., a physical uplink shared channel (PUSCH) uplink transmission) and the second uplink grant in the DCI of downlink transmission 215 may schedule a corresponding second uplink transmission 225. In some aspects, the downlink transmission 205, the downlink transmission 210, the downlink transmission 215, the first uplink transmission 220, and the second uplink transmission 225 may occur within a channel occupancy time. For example, a base station may perform a LBT procedure on the channel to secure the channel for the channel occupancy time. Accordingly, the downlink transmission 205, the downlink transmission 210, and the downlink transmissions 215 may be communicated during the channel occupancy time and over the shared or unlicensed radio frequency spectrum band.

The UE may determine or otherwise identify the transmission gap 230 between the first uplink transmission 220 and the second uplink transmission 225. In some aspects, the UE may determine whether the transmission gap 230 corresponds to the lost uplink grant carried in downlink transmission 210 (as shown in FIG. 2A) or corresponds to a downlink transmission 235 occurring during the transmission gap 230 (as shown in FIG. 2B).

In some aspects, the UE may determine whether transmission gap 230 corresponds to the lost uplink grant carried in the DCI of downlink transmission 210-a based on either a burst ID (as shown in FIG. 2A) or using an SFI plus the allocation for the UE (not shown). The burst ID may be a single toggle bit (e.g., "1" or "0") or may include a burst ID mod~N for an N-bit burst ID. The N bit burst ID may be used to ensure that the burst ID does not repeat within a channel occupancy time with multiple uplink/downlink transmission switches. In some aspects, a same burst ID X ms away may be considered as different burst IDs by the UE. In this way, if all of the uplink grants (e.g., DCI within a PDCCH or downlink transmission) in one burst ID are lost, the same burst ID used later may not cause confusion by the UE. The burst ID may be included in downlink grant(s) (e.g., for acknowledgement (ACK) requests, channel state information (CSI) reporting requests, etc.), in uplink grants, in a transmit power control (TPC) command, in a sounding reference signal (SRS) request, and the like. However, in some aspects the burst ID may be included in the uplink grants to minimize confusion.

Accordingly, the UE may determine a first burst ID of the first uplink transmission 220 and a second burst ID of the second uplink transmission 225. The UE may determine that the transmission gap 230 corresponds to the lost uplink grant carried in the DCI of downlink transmission 210-a based on the first burst ID and/or the second burst ID. For example, the burst ID may be a single toggle bit set to "0" to indicate successive uplink transmissions. Based on the first downlink grant carried in the DCI of downlink transmission 205 burst ID of "0" and the second downlink grant carried in the DCI of downlink transmission 215 burst ID of "0," the UE may determine that the transmission gap 230 corresponds to a lost uplink grant in downlink transmission 210-a. In another example, the burst ID may be a mod-N bit burst ID where the burst IDs carried or conveyed in the uplink grants may be sequential. For example, the uplink grant carried in the downlink transmission 205 may include a burst ID of "0," the uplink grant carried in the downlink transmission 210-a may include a burst ID of "1," and the uplink grant carried in the downlink transmission 215 may include a burst ID of "2." Accordingly, the UE may determine that the transmission gap 230 corresponds to the lost uplink grant in downlink transmission 210-a based on the missing burst ID of "1."

In the SFI+UE allocation approach, the UE may receive a SFI (e.g., via higher layer signaling) which may identify transmission directions (e.g., downlink or uplink) for multiple time periods (e.g., for multiple symbols within a slot) within the COT. Conventionally, the SFI may be sent less frequently than DCI and, in some cases, one or more of the time periods may be overwritten by a DCI for a particular time period. However, the SFI configuration of the UE may provide an indication of the transmission direction for each time period. This may be leveraged, along with the UE allocation, to help the UE determine whether the transmission gap 230 corresponds to a lost uplink grant or a downlink transmission 235 occurring with the transmission gap 230. For example, if the SFI indicates that the transmission direction is a downlink transmission during the transmission gap 230, the UE may identify that the transmission gap 230 corresponds to a downlink transmission 235. However, if the SFI indicates that the transmission direction is an uplink transmission during the transmission gap 230, the UE may determine that the transmission gap 230 is based on a lost uplink grant in the downlink transmission 210-a.

Accordingly, the UE may determine the transmission direction configured for the transmission gap 230, e.g., based on the transmission direction indicated in the SFI. If the UE determines that the time period corresponding to the transmission gap 230 is configured for an uplink transmission direction, the UE may determine that the transmission gap 230 corresponds to the lost uplink grant in downlink transmission 210-a. If the UE determines that the time period corresponding to the transmission gap 230 is configured for a downlink transmission, the UE may determine that the transmission gap 230 corresponds to a downlink transmission 235. Based on this, the UE may determine that downlink transmission 210-b does not include an uplink grant for the UE.

If the UE determines that the transmission gap 230 corresponds to a lost uplink grant, the UE may modify one or more uplink transmissions in response. In one approach, this may include the UE attempting to transmit one of the uplink transmissions, without performing the other uplink transmissions. For example, the UE may transmit the first uplink transmission 220 and/or may transmit the longest contiguous set of uplink transmissions. Accordingly, the UE may drop the first uplink transmission 220 and/or the second uplink transmission 225 based on the transmission time and/or the length of the uplink transmissions.

In another approach, the UE may only perform uplink transmissions that pass an LBT procedure (as shown in dashed lines). For example, the UE may perform the first uplink transmission 220 if the LBT procedure is successful. If the LBT procedure for the first uplink transmission 220 fails, the UE may attempt another LBT procedure for the second uplink transmission 225 and perform the second uplink transmission 225 if the LBT procedure is successful. The UE may follow this approach for a threshold number of uplink transmissions and, if the corresponding LBT procedures are unsuccessful, the UE may drop the remaining uplink transmissions. In some aspects, the UE may skip an LBT procedure for the first uplink transmission 220 (e.g., due to the previous downlink transmission) within the COT.

Accordingly, the UE may perform an LBT procedure in connection with the first uplink transmission 220 and/or the second uplink transmission 225 based on the transmission gap 230 corresponding to a lost uplink grant. In some aspects, the UE may drop the first uplink transmission 220 and/or the second uplink transmission 225 based on the result of the corresponding LBT procedures.

In another approach, the UE may modify one or more of the LBT procedures. For example, the UE may attempt a full LBT procedure (e.g., a CAT-2 LBT procedure) for the first uplink transmission 220. If that LBT procedure is successful, the UE may use short LBT procedures (e.g., CAT-4 LBT procedures) for the remaining uplink transmissions. This approach may be followed regardless of the type of LBT procedure indicates in the corresponding uplink grants. Accordingly, the UE may modify the LBT procedure performed before the first uplink transmission 220 and/or the second uplink transmission 225 based on the transmission gap corresponding to a lost uplink grant.

In another approach, the UE may attempt to perform each uplink transmission using the indicated LBT type (e.g., CAT-2). That is, the UE may attempt to perform each uplink transmission using the type of LBT procedure indicated in the uplink grant corresponding to that uplink transmission.

Figure 3A:
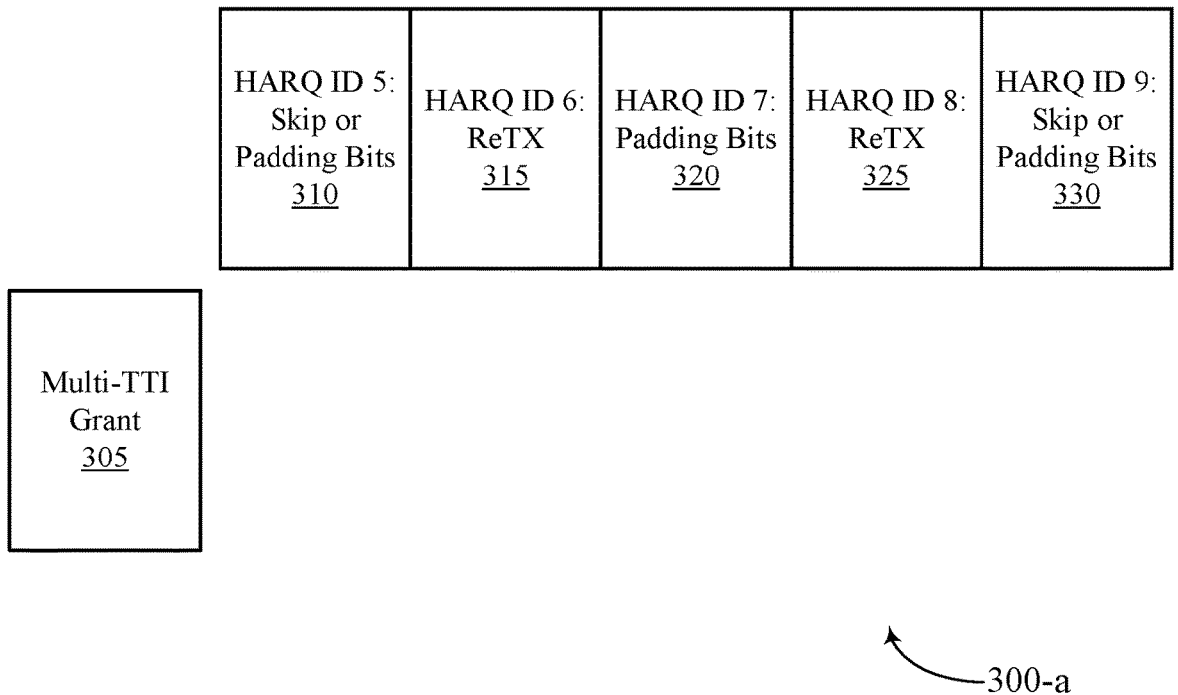
FIGS. 3A and 3B illustrate examples of a transmission configuration that supports handling gaps in uplink transmission in NR-U in accordance with aspects of the present disclosure.
Figure 3B:
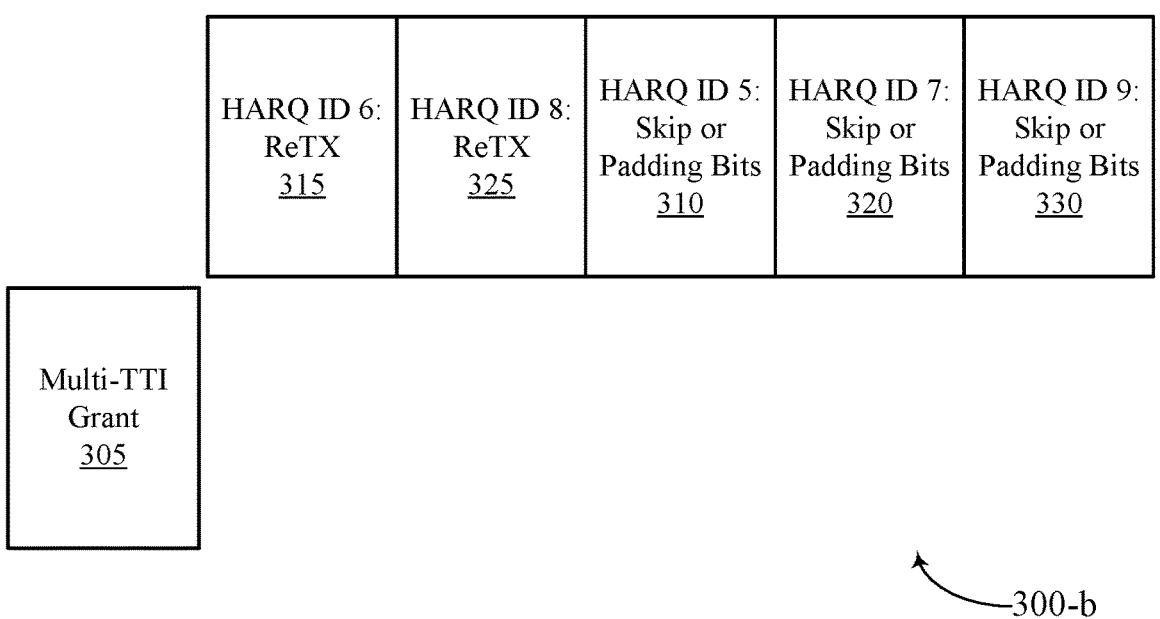

FIG. 3 illustrates an example of a transmission configuration 300 that supports handling gaps in uplink transmission in NR-U in accordance with aspects of the present disclosure. In some examples, transmission configuration 300 may implement aspects of wireless communications system 100 and/or transmission configuration 200. Aspects of transmission configuration 300 may be implemented by a base station and/or a UE, which may be examples of the corresponding devices described herein. Generally, FIG. 3A illustrates an example where a UE skips or pads uplink transmissions based on a transmission gap and FIG. 3B illustrate an example where a UE reorders uplink transmission based on a transmission gap.

Conventionally, the UE may be allowed to skip (e.g., not transmit) uplink transmissions scheduled by uplink grants in some scenarios. In one scenario, the UE may skip the uplink transmission if the UE does not have any new data/MAC control element (CE) in its uplink buffer. In some examples, such skipping may always be allowed. For dynamic grants, the network may configure the UE as to whether skipping is allowed, e.g., based on a Boolean parameter skipUplinkTxDyamic. In another scenario, UE can skip the uplink transmission if the uplink grant is for a retransmission for a cell specific radio network temporary identifier (CS-RNTI) and the corresponding hybrid automatic repeat/request (HARQ) process is empty. Generally, skipping is beneficial in wireless communication systems, such as in a NR-U network, because it reduces interference.

However, skipping uplink transmissions may cause issues in the case of multi-TTI grants. If the UE receives retransmission grants and new transport block (TB) grants using a multi-TTI grant, then skipping uplink transmissions according to the above scenarios may lead to transmission gaps. For example, a multi-TTI grant may allocate (HARQ process number, new or retransmission (ReTX)) uplink transmission 310 as 5, new; uplink transmission 315 as 6, ReTX; uplink transmission 320 as 7, new; uplink transmission 325 as 8, ReTX; and uplink transmission 330 as 9, new. If there is no new data/MAC CE in the UE buffer, then the UE will transmit HARQ processes 6 and 8, but there would be a transmission gap between HARQ processes 6 and 8, which is reserved for HARQ process 7 (e.g., uplink transmission 320). Accordingly, aspects of the described techniques provide a mechanism where the UE can skip or avoid these transmission gaps and, if unavoidable, how the UE may respond.

Accordingly, the UE may receive an uplink grant 305 scheduling a plurality of uplink transmissions during a corresponding plurality of TTIs in a shared or unlicensed radio frequency spectrum band, e.g., uplink transmissions 310-330. In one example, uplink grant 330 may be a configured uplink grant. To eliminate occurrence of a transmission gap, the UE may modify one or more of the uplink transmissions before performing the plurality of uplink transmissions according to the uplink grant and the modifications.

In one approach shown in FIG. 3A, this may include disabling skipping of the uplink transmissions. One option may include the UE transmitting padding bits in the uplink transmissions which create a transmission gaps (e.g., in uplink transmission 320). The UE may disable skipping for the case where skipping would create a transmission gap, e.g., the UE would disable skipping for HARQ process 7. Accordingly, the UE may add padding bits to a subset of the plurality of uplink transmissions (e.g., uplink transmission 320 corresponding to HARQ process 7) that are associated with the transmission gap.

Another option may include disabling skipping completely for the plurality of uplink transmissions. For example, the UE may add padding bits in HARQ processes 5, 7, and 9 (e.g., in uplink transmissions 310, 320, and 330) in this option. Accordingly, the UE may add padding bits to each of the plurality of uplink transmissions that are associated with an empty uplink buffer status.

In another option, skipping may be enabled/disabled using a DCI. For example, the DCI scheduling the multi-TTI grant (e.g., uplink grant 305) may indicate whether the UE can apply skipping for the indicated grants. Accordingly, the UE may determine, based on the uplink grant 305, that the plurality of uplink transmissions are configured for skipping.

The UE may skip the uplink transmissions that are associated with the transmission gap (e.g., uplink transmission 320).

To disable skipping, the UE may include padding bits to prepare the MAC protocol data unit (PDU) and/or the UE may include a new MAC CE along with padding bits. The new MAC CE may indicate that there is no data for the scheduled HARQ process.

In another approach shown in FIG. 3B, the HARQ process IDs may be scheduled (or reordered) so that retransmission grants are bundled together and new TB grants are bundled together. For example, HARQ process IDs are reordered according to the following time order of a multi-TTI grant: uplink transmission 315 as 6, ReTX; uplink transmission 325 as 8, ReTX; uplink transmission 310 as 5, new; uplink transmission 320 as 7, new; and uplink transmission 330 as 9, new. Accordingly, the grants for the retransmissions may use the first three slots of the multi-TTI grant and then the network can schedule new TB grants in the remaining slots. In some aspects, the time order may be reversed, e.g., the new TB grants may be scheduled first and then the retransmission grants may be scheduled next. Accordingly, the UE may reorder, according to the transmission gap, the plurality of uplink transmissions to eliminate the transmission gap.

However, in some situations avoiding the transmission gap may not be possible. For example, a transmission gap may be unavoidable between two successive or subsequent uplink transmissions. Accordingly, aspects of the described techniques may include the UE modifying one or more of the uplink transmissions.

For example, the UE may perform a full LBT procedure (e.g., a category 2 LBT procedure) on an uplink transmission that follows the transmission gap. The UE may perform the full LBT procedure regardless of what the network indicates as the LBT procedure to be performed for the corresponding uplink transmission.

In another example, the UE may use a short LBT procedure (e.g., a one-shot or category 4 LBT procedure) if the duration of the transmission gap is between a first and second threshold. For example, the transmission gap may be considered a pause duration (e.g., the channel occupancy time is paused during the transmission gap). The network (e.g., a base station) may indicate to the UE whether or not the UE can apply the pause. The network may also indicate how many pause durations are allowed within the multi-TTI grant. The first threshold and the second threshold may be in terms of time units (e.g., microseconds) or may be in terms of slots/subframes. In one example, the first threshold may be 100 μs and the second threshold may have a value of infinity. In the situation where the duration of the transmission gap is not within the thresholds and/or if the UE is not configured to apply the pause, the UE may perform the category 4 LBT procedure for the uplink transmission occurring after the transmission gap. Accordingly, the UE may determine that a duration of the transmission gap is within a threshold range and, based on the duration, perform the short LBT procedure before the uplink transmission following the transmission gap.

In another approach, the UE may perform a full LBT procedure irrespective of the transmission gap if the base station indicates for the UE to perform a short LBT procedure or if the uplink transmission following the transmission gap occurs within the channel occupancy time. Accordingly, the UE may perform a short LBT procedure before an uplink transmission following the transmission gap based on the uplink grant configuring the short LBT procedure and/or on the uplink transmission be performed during the channel occupancy time associated with the plurality of TTIs.

In some of the approaches above, the UE may perform a short LBT procedures if the UE has not exhausted its share of allocated short LBT procedures for the multi-TTI grant. For example, the base station may indicate the number of short LBT procedures applicable for the multi-TTI grant. If the UE is already exhausted the number of short LBT procedure attempts, then it may perform a full LBT after every transmission gap.

Figure 4:
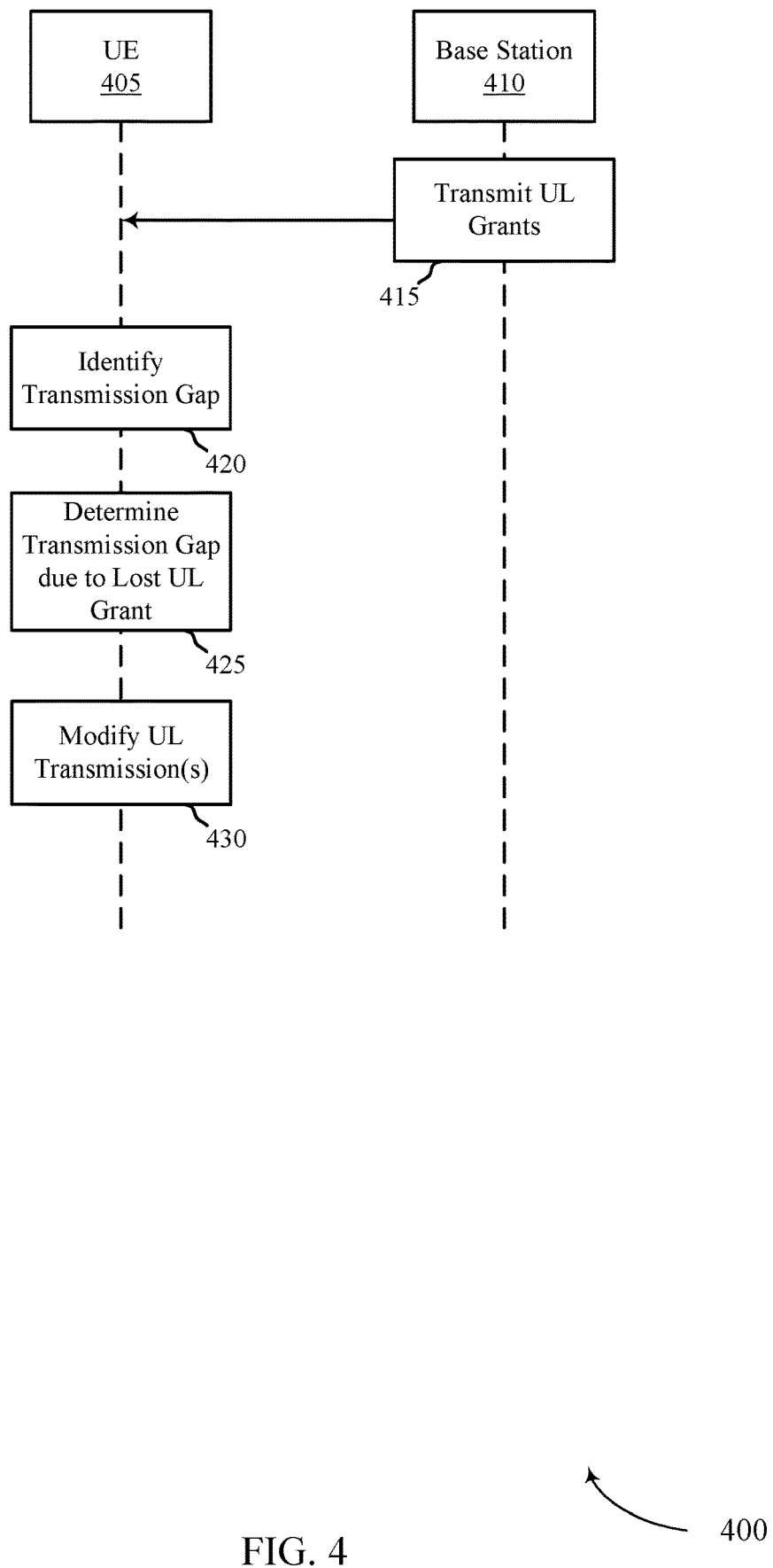
FIG. 4 illustrates an example of a process that supports handling gaps in uplink transmission in NR-U in accordance with aspects of the present disclosure.

FIG. 4 illustrates an example of a process 400 that supports handling gaps in uplink transmission in NR-U in accordance with aspects of the present disclosure. In some examples, process 400 may implement aspects of wireless communications system 100 and/or transmission configurations 200 and/or 300. Aspects of process 400 may be implemented by the UE 405 and/or base station 410, which may be examples of corresponding devices described herein.

At 415, base station 410 may transmit (and UE 405 may receive) a set of one or more uplink grants scheduling at least a first uplink transmission and the second uplink transmission during a channel occupancy time of an unlicensed radio frequency spectrum band. At 420, UE 405 may identify a transmission gap between the first uplink transmission and the second uplink transmission of the plurality of uplink transmissions by the UE 405 during the channel occupancy time.

At 425, UE 405 may determine that the transmission gap corresponds to a lost uplink grant. In some aspects, the transmission gap may exceed a threshold time. In some aspects, this may include UE 405 determining a first burst identifier of the first uplink transmission and a second burst identifier of the second uplink transmission. Determining that the transmission gap corresponds to the loss uplink grant may be based at least in part on the first burst identifier and/or the second burst identifier.

In some aspects, this may include UE 405 determining a transmission direction configured for the transmission gap. Determining that the transmission gap corresponds to the lost uplink grant may be based at least in part on the transmission direction. In some aspects, the transmission direction configured for the transmission gap may be based on a SFI.

At 430, UE 405 may modify the first uplink transmission and/or the second uplink transmission based at least in part on the determination that the transmission gap corresponds to the lost uplink grant.

In some aspects, this may include UE 405 dropping the first uplink transmission or the second uplink transmission based on a length of the first uplink transmission or the second uplink transmission. In some aspects, this may include UE 405 dropping the first uplink transmission or the second uplink transmission based on a transmission time of the first uplink transmission or the second uplink transmission.

In some aspects, this may include UE 405 performing a LBT procedure in connection with the first uplink transmission and/or the second uplink transmission based on the transmission gap.

In some aspects, this may include UE 405 dropping the first uplink transmission or the second uplink transmission based on a result of an LBT procedure. In some aspects, this may include UE 405 modifying an LBT procedure performed before at least one of the first uplink transmission and/or the second uplink transmission based on the transmission gap.

Figure 5:
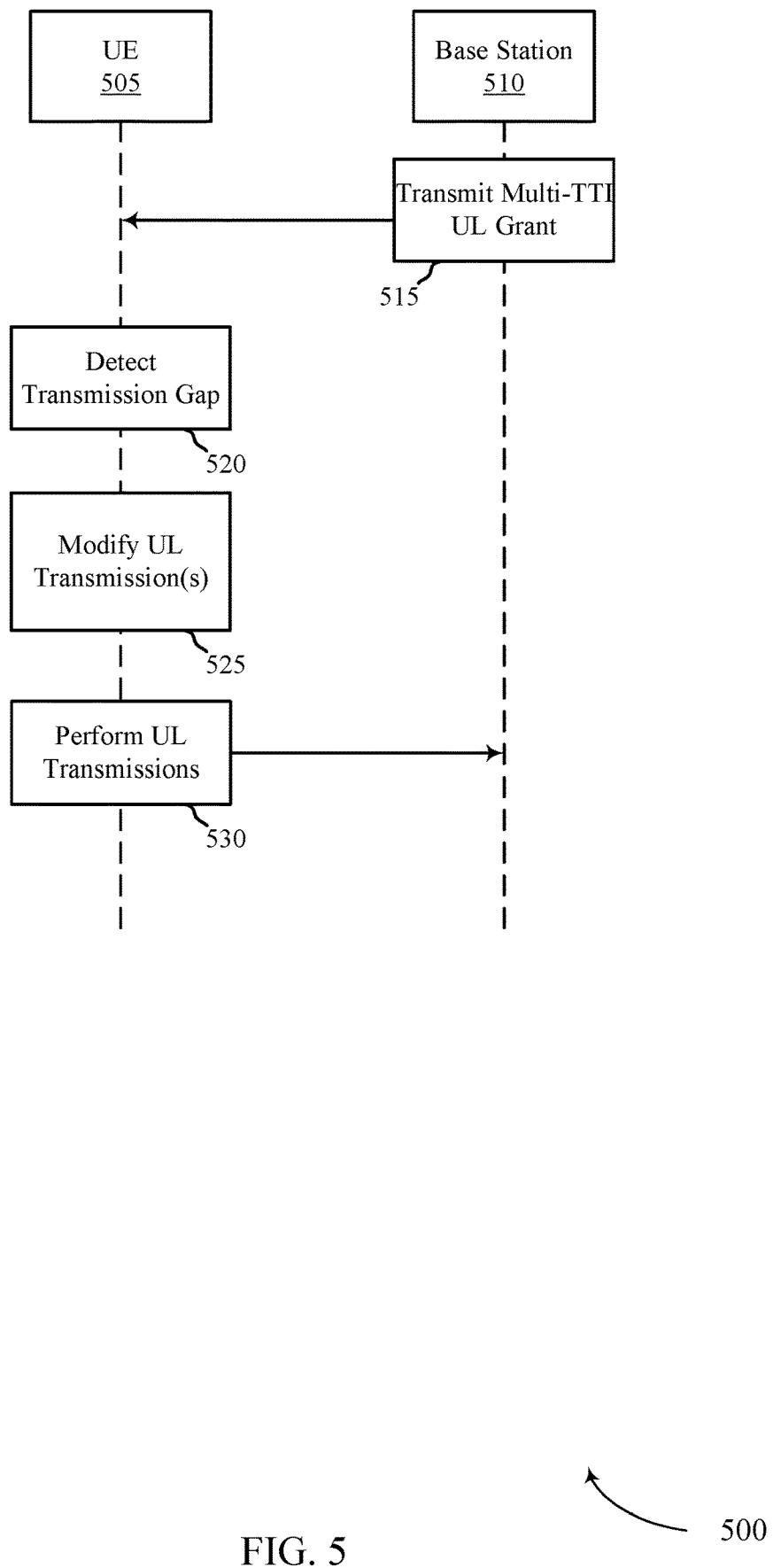
FIG. 5 illustrates an example of a process that supports handling gaps in uplink transmission in NR-U in accordance with aspects of the present disclosure.

FIG. 5 illustrates an example of a process 500 that supports handling gaps in uplink transmission in NR-U in accordance with aspects of the present disclosure. In some examples, process 500 may implement aspects of wireless communications system 100 and/or transmission configurations 200 and/or 300. Aspects of process 500 may be implemented by UE 505 and/or base station 510, which may be examples of the corresponding devices described herein.

At 515, base station 510 may transmit (and UE 505 may receive) an uplink grant scheduling a plurality of uplink transmissions during a corresponding plurality of TTIs in an unlicensed radio frequency spectrum band.

At 520, UE 505 may detect, based on the uplink grant and the uplink buffer status of UE 505, a transmission gap in the plurality of TTIs. The transmission gap may be associated with a lost uplink grant, e.g., the transmission gap may correspond to a transmission gap in the plurality of TTIs that corresponds to a lost uplink grant.

At 525, UE 505 may modify one or more uplink transmissions of the plurality of uplink transmissions based on the transmission gap. In some aspects, this may include UE 505 adding padding bits to a subset of the plurality of uplink transmissions that are associated with the transmission gap. In some aspects, this may include UE 505 adding padding bits to each of the plurality of uplink transmissions that are associated with an empty uplink buffer status. In some aspects, this may include UE 505 determining, based on the uplink grant, that the plurality of uplink transmissions are configured for skipping. The UE may skip the uplink transmissions that are associated with the transmission gap.

In some aspects, this may include UE 505 reordering, based on the transmission gap, the plurality of uplink transmissions to eliminate the transmission gap. In some aspects, this may include UE 505 performing a full LBT procedure before an uplink transmission following the transmission gap based on the determination that the transmission gap corresponds to a lost uplink grant.

In some aspects, this may include UE 505 determining that a duration of the transmission gap is within a threshold range. The UE may perform, based on the duration being within the threshold range, a short LBT procedure before an uplink transmission following the transmission gap.

In some aspects, this may include UE 505 performing a short LBT procedure before an uplink transmission following the transmission gap based on the uplink grant configuring the short LBT procedure and/or on the uplink transmission being performed during the channel occupancy time associated with the plurality of TTIs.

At 530, UE 505 may perform or otherwise transmit (and base station 510 may receive) the plurality of uplink transmissions based on the uplink grant and the modifications.

Figure 6:
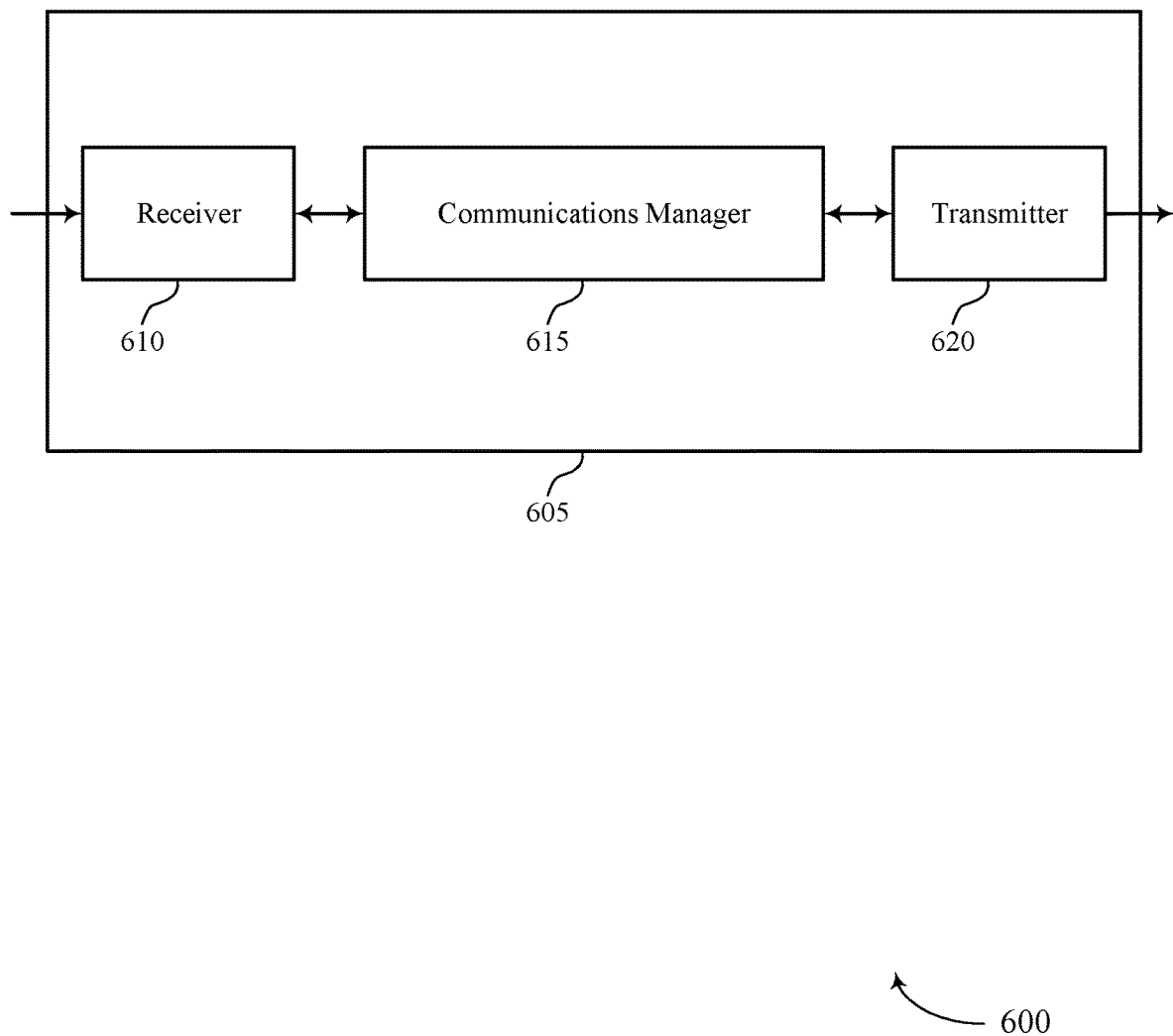
FIGS. 6 and 7 show block diagrams of devices that support handling gaps in uplink transmission in NR-U in accordance with aspects of the present disclosure.

FIG. 6 shows a block diagram 600 of a device 605 that supports handling gaps in uplink transmission in NR-U in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to handling gaps in uplink transmission in NR-U, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a set of one or more uplink grants scheduling at least a first uplink transmission and a second uplink transmission during a channel occupancy time of an unlicensed radio frequency spectrum band, identify a transmission gap between the first uplink transmission and the second uplink transmission of the set of uplink transmissions by the UE during the channel occupancy time, the transmission gap exceeding a threshold time, determine that the transmission gap corresponds to a lost uplink grant, and modify the first uplink transmission or the second uplink transmission based on the determination that the transmission gap corresponds to the lost uplink grant.

The communications manager 615 may also receive an uplink grant scheduling a set of uplink transmissions during a set of TTIs in an unlicensed radio frequency spectrum band, modify one or more uplink transmissions of the set of uplink transmissions based on the uplink grant, and perform the set of uplink transmissions based on the uplink grant and the modifying. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
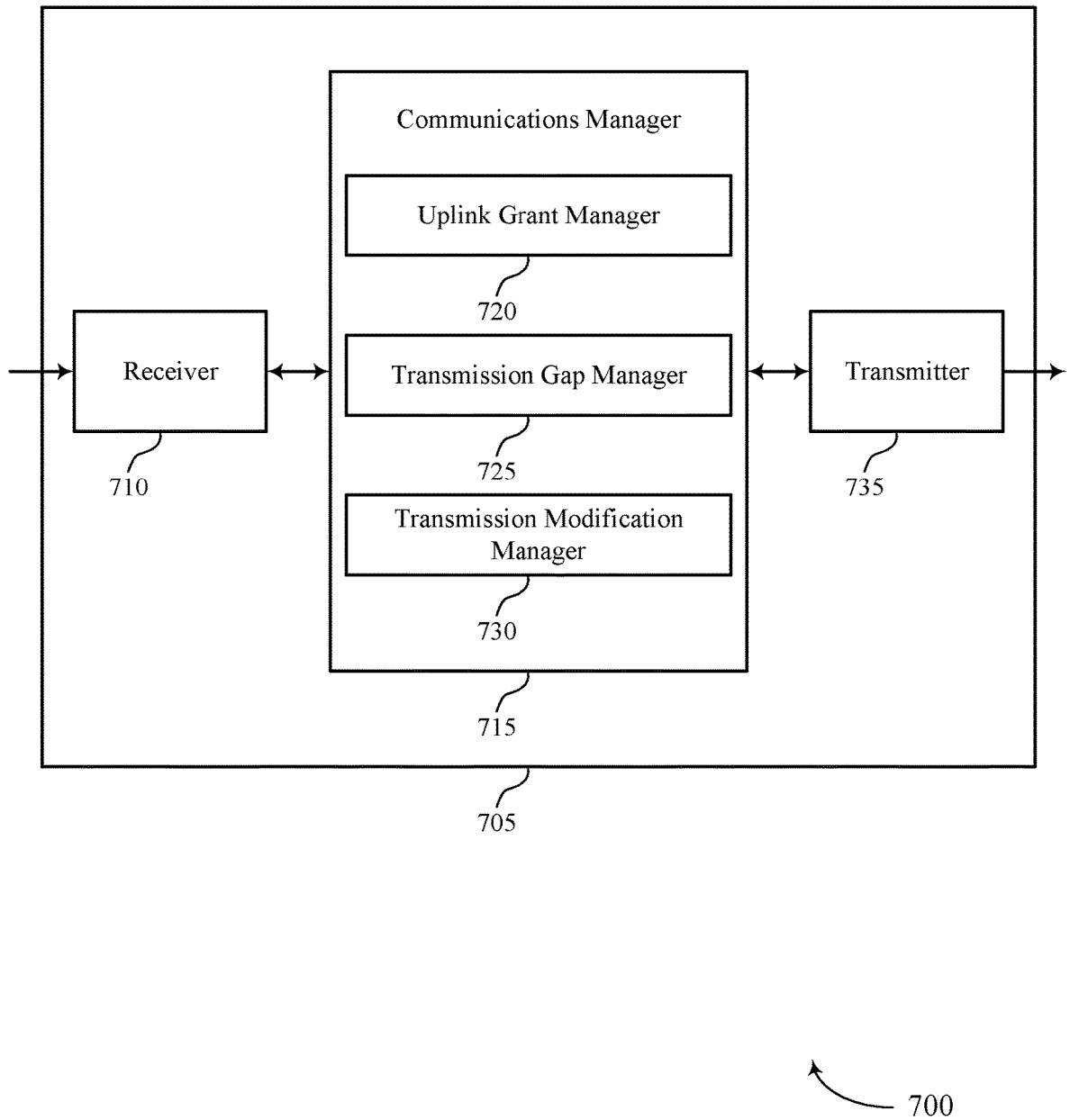

FIG. 7 shows a block diagram 700 of a device 705 that supports handling gaps in uplink transmission in NR-U in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to handling gaps in uplink transmission in NR-U, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink grant manager 720, a transmission gap manager 725, and a transmission modification manager 730. The communications manager 715 may be an example of aspects of the communications manager 910 described herein.

The uplink grant manager 720 may receive a set of one or more uplink grants scheduling at least a first uplink transmission and a second uplink transmission during a channel occupancy time of an unlicensed radio frequency spectrum band.

The transmission gap manager 725 may identify a transmission gap between the first uplink transmission and the second uplink transmission of the set of uplink transmissions by the UE during the channel occupancy time, the transmission gap exceeding a threshold time and determine that the transmission gap corresponds to a lost uplink grant.

The transmission modification manager 730 may modify the first uplink transmission or the second uplink transmission based on the determination that the transmission gap corresponds to the lost uplink grant.

The uplink grant manager 720 may receive an uplink grant scheduling a set of uplink transmissions during a set of TTIs in an unlicensed radio frequency spectrum band.

The transmission modification manager 730 may modify one or more uplink transmissions of the set of uplink transmissions based on the uplink grant and perform the set of uplink transmissions based on the uplink grant and the modifying.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
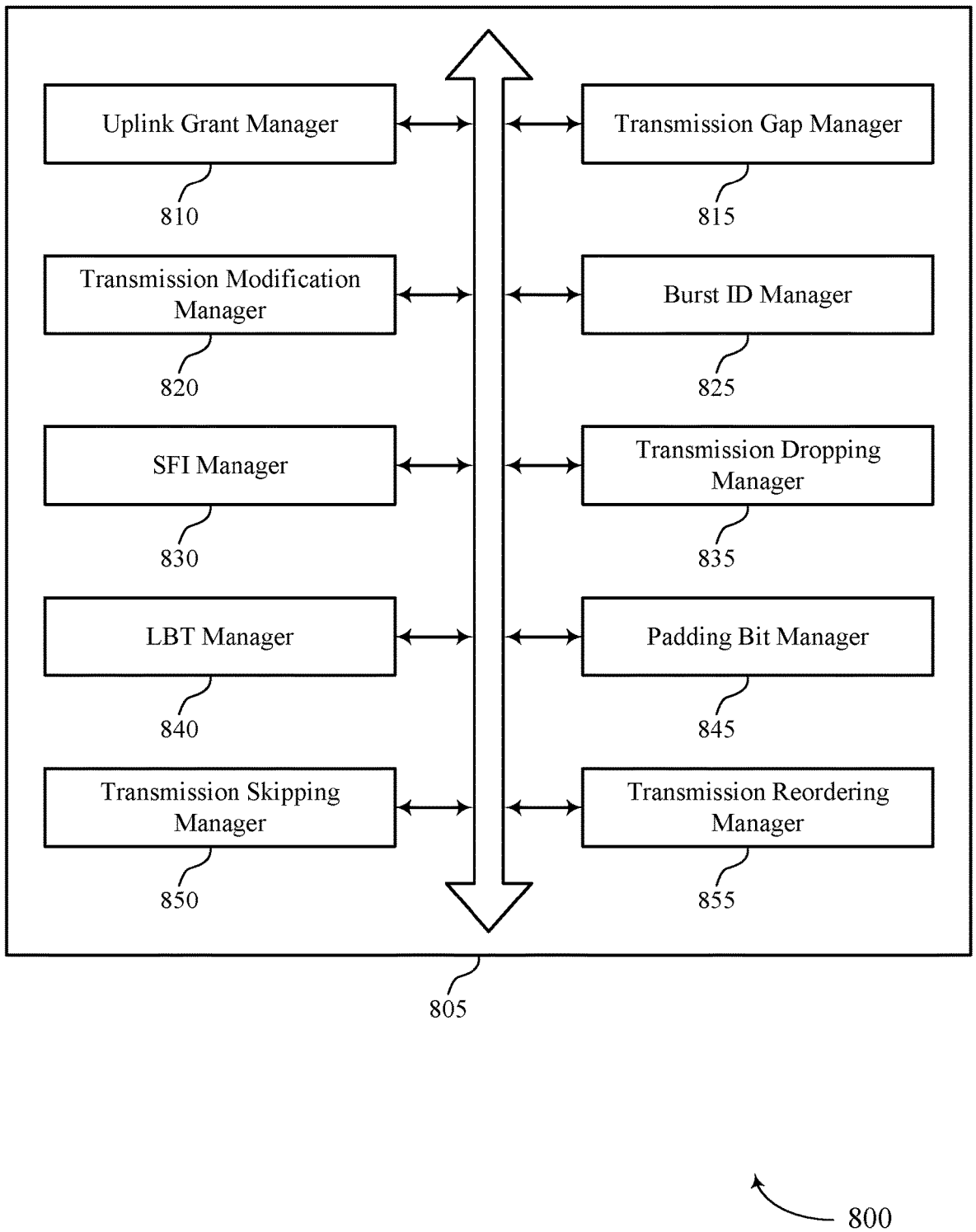
FIG. 8 shows a block diagram of a communications manager that supports handling gaps in uplink transmission in NR-U in accordance with aspects of the present disclosure.

FIG. 8 shows a block diagram 800 of a communications manager 805 that supports handling gaps in uplink transmission in NR-U in accordance with aspects of the present disclosure. The communications manager 805 may be an example of aspects of a communications manager 615, a communications manager 715, or a communications manager 910 described herein. The communications manager 805 may include an uplink grant manager 810, a transmission gap manager 815, a transmission modification manager 820, a burst ID manager 825, a SFI manager 830, a transmission dropping manager 835, a LBT manager 840, a padding bit manager 845, a transmission skipping manager 850, and a transmission reordering manager 855. Each of these modules may communicate, directly or indirectly, with one another (e.g., via one or more buses).

The uplink grant manager 810 may receive a set of one or more uplink grants scheduling at least a first uplink transmission and a second uplink transmission during a channel occupancy time of an unlicensed radio frequency spectrum band.

In some examples, the uplink grant manager 810 may receive an uplink grant scheduling a set of uplink transmissions during a set of TTIs in an unlicensed radio frequency spectrum band.

The transmission gap manager 815 may identify a transmission gap between the first uplink transmission and the second uplink transmission of the set of uplink transmissions by the UE during the channel occupancy time, the transmission gap exceeding a threshold time.

In some examples, the transmission gap manager 815 may determine that the transmission gap corresponds to a lost uplink grant.

The transmission modification manager 820 may modify the first uplink transmission or the second uplink transmission based on the determination that the transmission gap corresponds to the lost uplink grant.

In some examples, the transmission modification manager 820 may modify one or more uplink transmissions of the set of uplink transmissions based on the uplink grant.

In some examples, the transmission modification manager 820 may perform the set of uplink transmissions based on the uplink grant and the modifying.

The burst ID manager 825 may determine a first burst identifier of the first uplink transmission and a second burst identifier of the second uplink transmission, where determining that the transmission gap corresponds to the lost uplink grant is based on the first burst identifier and the second burst identifier.

The SFI manager 830 may determine a transmission direction configured for the transmission gap, where determining that the transmission gap corresponds to the lost uplink grant is based on the transmission direction.

In some cases, the transmission direction configured for the transmission gap is based on a slot format indicator.

The transmission dropping manager 835 may drop the first uplink transmission or the second uplink transmission based on a length of the first uplink transmission or the second uplink transmission.

In some examples, the transmission dropping manager 835 may drop the first uplink transmission or the second uplink transmission based on a transmission time of the first uplink transmission or the second uplink transmission.

In some examples, the transmission dropping manager 835 may drop the first uplink transmission or the second uplink transmission based on a result of a LBT procedure.

The LBT manager 840 may detect, based at least in part on the uplink grant and an uplink buffer status, a transmission gap in the plurality of TTIs, perform a LBT procedure in connection with one or more of the first uplink transmission, or the second uplink transmission, or a combination thereof, based on the transmission gap.

In some examples, the LBT manager 840 may modify a LBT procedure performed before at least one of the first uplink transmission, or the second uplink transmission, or a combination thereof, based on the transmission gap.

In some examples, the LBT manager 840 may detect, based at least in part on the uplink grant and an uplink buffer status, a transmission gap associated with a lost uplink grant in the plurality of TTIs and perform a full LBT procedure before an uplink transmission following the transmission gap based on the determination that the transmission gap corresponds to the lost uplink grant.

In some examples, the LBT manager 840 may determine that a duration of the transmission gap is within a threshold range.

In some examples, the LBT manager 840 may detect, based at least in part on the uplink grant and an uplink buffer status, a transmission gap in the plurality of TTIs and perform, based on the duration being within the threshold range, a short LBT procedure before an uplink transmission following the transmission gap.

In some examples, the LBT manager 840 may detect, based at least in part on the uplink grant and an uplink buffer status, a transmission gap in the plurality of TTIs and perform a short LBT procedure before an uplink transmission following the transmission gap based on the uplink grant configuring the short LBT procedure or on the uplink transmission being performed during the channel occupancy time associated with the set of TTIs.

The padding bit manager 845 may add padding bits to a subset of the set uplink transmissions for which no data is available.

In some examples, the padding bit manager 845 may add padding bits to each of the set uplink transmissions that are associated with the an empty uplink buffer status.

The transmission skipping manager 850 may determine, based on the uplink grant, that the set of uplink transmissions are configured for skipping.

In some examples, the transmission skipping manager 850 may skip the uplink transmissions that are associated with a transmission gap of the plurality of TTIs.

The transmission reordering manager 855 may reorder, based on the transmission gap, the set of uplink transmission to eliminate the transmission gap.

Figure 9:
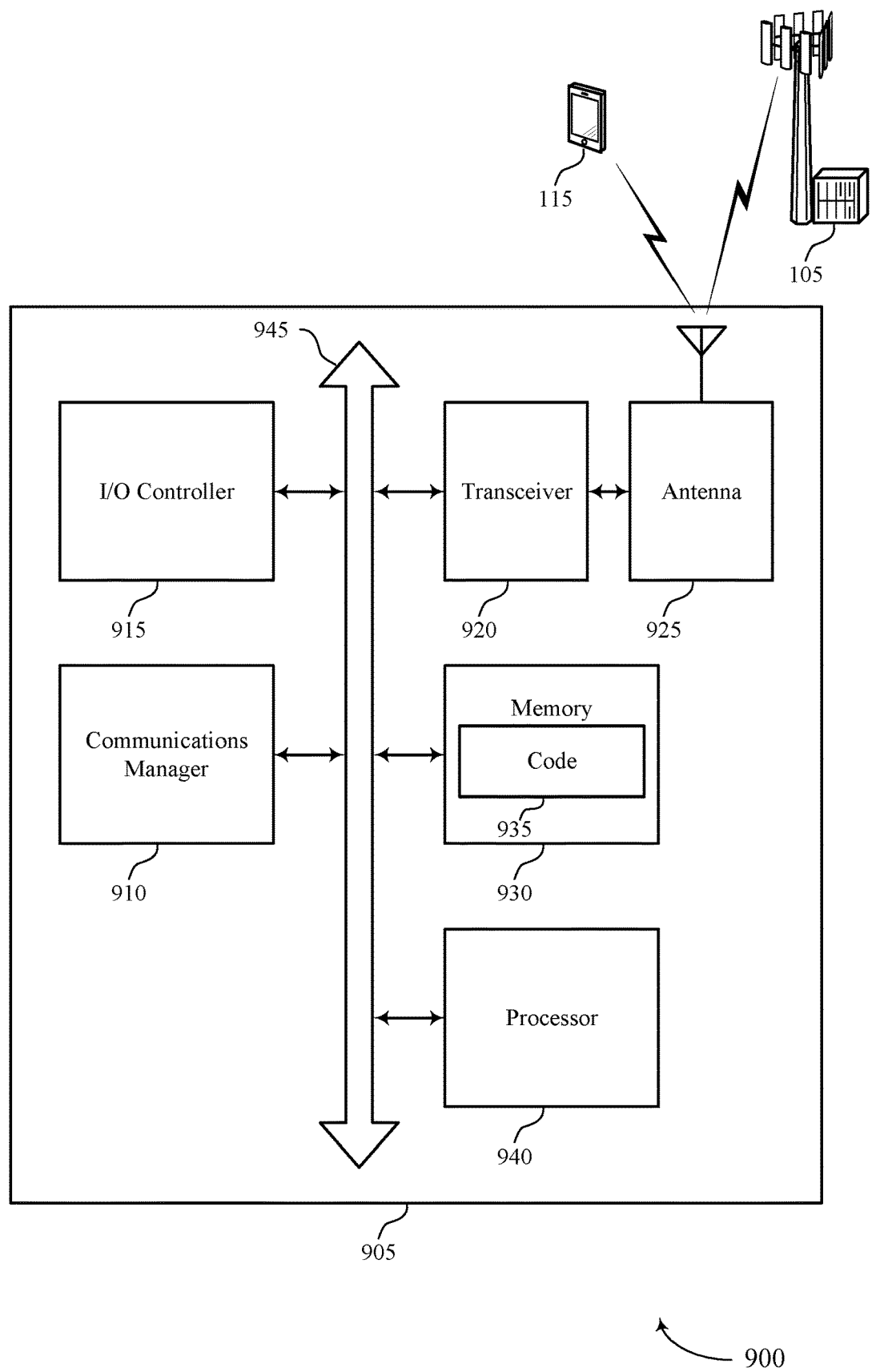
FIG. 9 shows a diagram of a system including a device that supports handling gaps in uplink transmission in NR-U in accordance with aspects of the present disclosure.

FIG. 9 shows a diagram of a system 900 including a device 905 that supports handling gaps in uplink transmission in NR-U in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a set of one or more uplink grants scheduling at least a first uplink transmission and a second uplink transmission during a channel occupancy time of an unlicensed radio frequency spectrum band, identify a transmission gap between the first uplink transmission and the second uplink transmission of the set of uplink transmissions by the UE during the channel occupancy time, the transmission gap exceeding a threshold time, determine that the transmission gap corresponds to a lost uplink grant, and modify the first uplink transmission or the second uplink transmission based on the determination that the transmission gap corresponds to the lost uplink grant.

The communications manager 910 may also receive an uplink grant scheduling a set of uplink transmissions during a set of TTIs in an unlicensed radio frequency spectrum band, modify one or more uplink transmissions of the set of uplink transmissions based on the uplink grant, and perform the set of uplink transmissions based on the uplink grant and the modifying.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting handling gaps in uplink transmission in NR-U).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
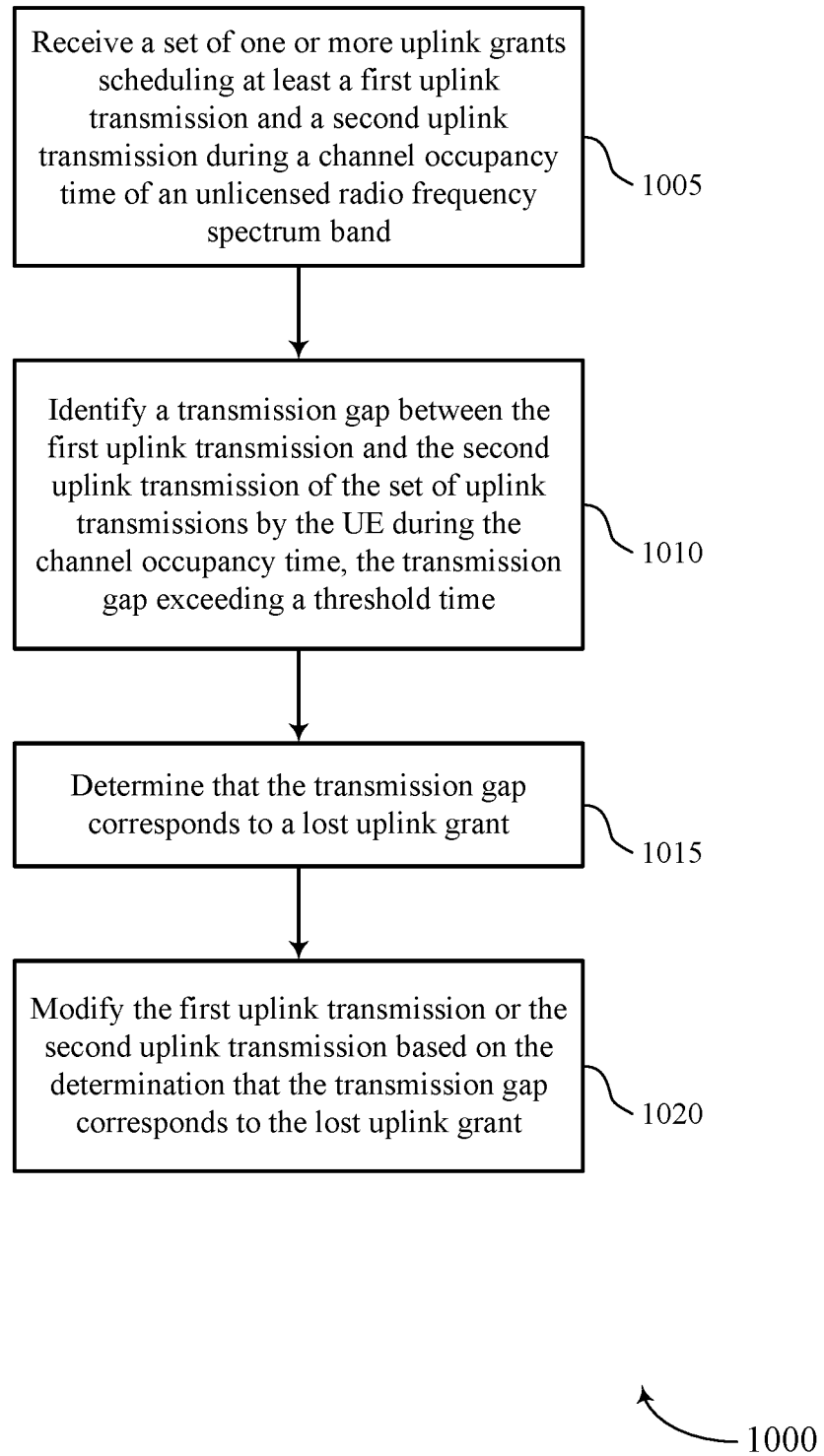
FIGS. 10 through 14 show flowcharts illustrating methods that support handling gaps in uplink transmission in NR-U in accordance with aspects of the present disclosure.

FIG. 10 shows a flowchart illustrating a method 1000 that supports handling gaps in uplink transmission in NR-U in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive a set of one or more uplink grants scheduling at least a first uplink transmission and a second uplink transmission during a channel occupancy time of an unlicensed radio frequency spectrum band. The operations of 1005 may be performed according to the methods described herein. In some examples, aspects of the operations of 1005 may be performed by an uplink grant manager as described with reference to FIGS. 6 through 9.

At 1010, the UE may identify a transmission gap between the first uplink transmission and the second uplink transmission of the set of uplink transmissions by the UE during the channel occupancy time, the transmission gap exceeding a threshold time. The operations of 1010 may be performed according to the methods described herein. In some examples, aspects of the operations of 1010 may be performed by a transmission gap manager as described with reference to FIGS. 6 through 9.

At 1015, the UE may determine that the transmission gap corresponds to a lost uplink grant. The operations of 1015 may be performed according to the methods described herein. In some examples, aspects of the operations of 1015 may be performed by a transmission gap manager as described with reference to FIGS. 6 through 9.

At 1020, the UE may modify the first uplink transmission or the second uplink transmission based on the determination that the transmission gap corresponds to the lost uplink grant. The operations of 1020 may be performed according to the methods described herein. In some examples, aspects of the operations of 1020 may be performed by a transmission modification manager as described with reference to FIGS. 6 through 9.

Figure 11:
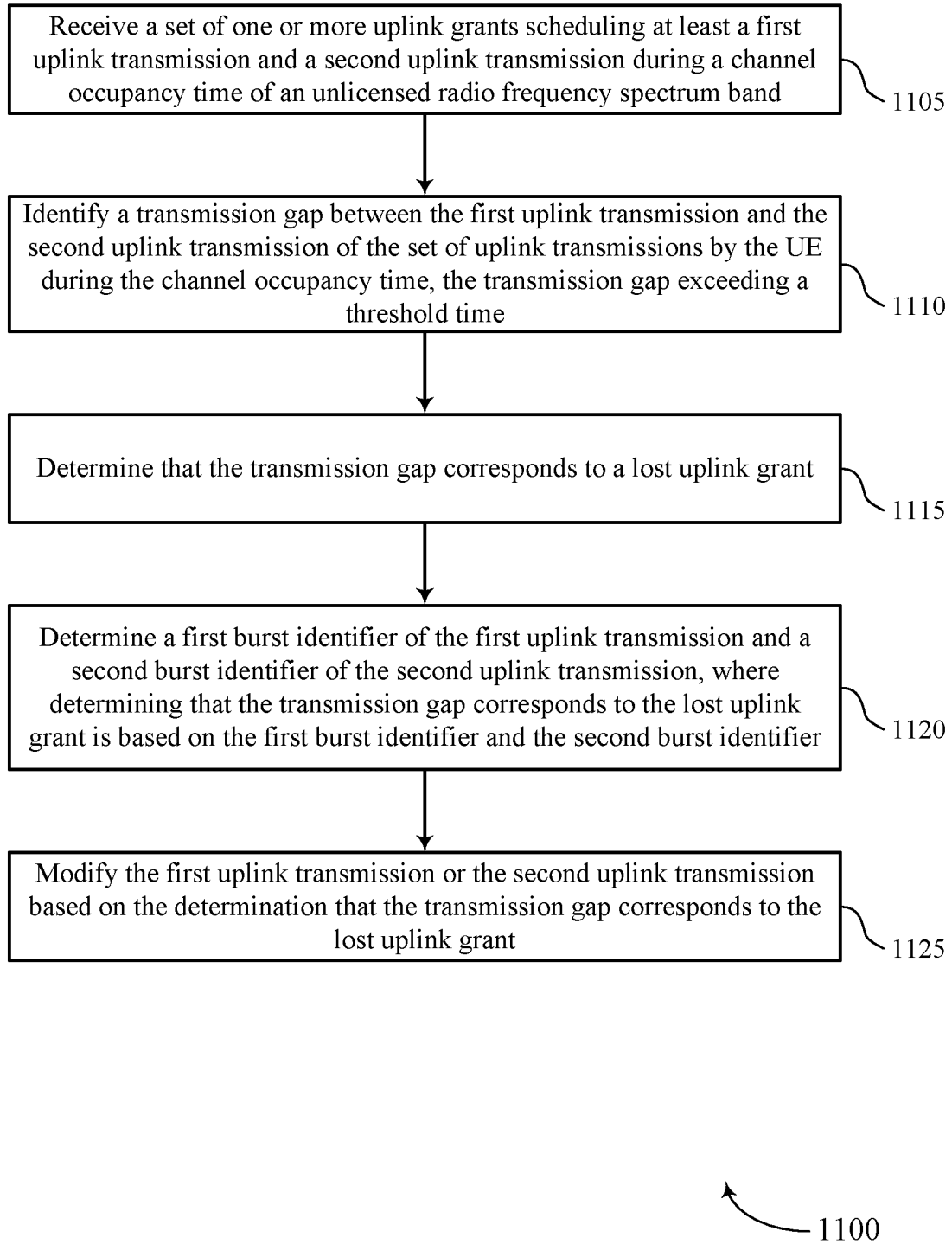

FIG. 11 shows a flowchart illustrating a method 1100 that supports handling gaps in uplink transmission in NR-U in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive a set of one or more uplink grants scheduling at least a first uplink transmission and a second uplink transmission during a channel occupancy time of an unlicensed radio frequency spectrum band. The operations of 1105 may be performed according to the methods described herein. In some examples, aspects of the operations of 1105 may be performed by an uplink grant manager as described with reference to FIGS. 6 through 9.

At 1110, the UE may identify a transmission gap between the first uplink transmission and the second uplink transmission of the set of uplink transmissions by the UE during the channel occupancy time, the transmission gap exceeding a threshold time. The operations of 1110 may be performed according to the methods described herein. In some examples, aspects of the operations of 1110 may be performed by a transmission gap manager as described with reference to FIGS. 6 through 9.

At 1115, the UE may determine that the transmission gap corresponds to a lost uplink grant. The operations of 1115 may be performed according to the methods described herein. In some examples, aspects of the operations of 1115 may be performed by a transmission gap manager as described with reference to FIGS. 6 through 9.

At 1120, the UE may determine a first burst identifier of the first uplink transmission and a second burst identifier of the second uplink transmission, where determining that the transmission gap corresponds to the lost uplink grant is based on the first burst identifier and the second burst identifier. The operations of 1120 may be performed according to the methods described herein. In some examples, aspects of the operations of 1120 may be performed by a burst ID manager as described with reference to FIGS. 6 through 9.

At 1125, the UE may modify the first uplink transmission or the second uplink transmission based on the determination that the transmission gap corresponds to the lost uplink grant. The operations of 1125 may be performed according to the methods described herein. In some examples, aspects of the operations of 1125 may be performed by a transmission modification manager as described with reference to FIGS. 6 through 9.

Figure 12:
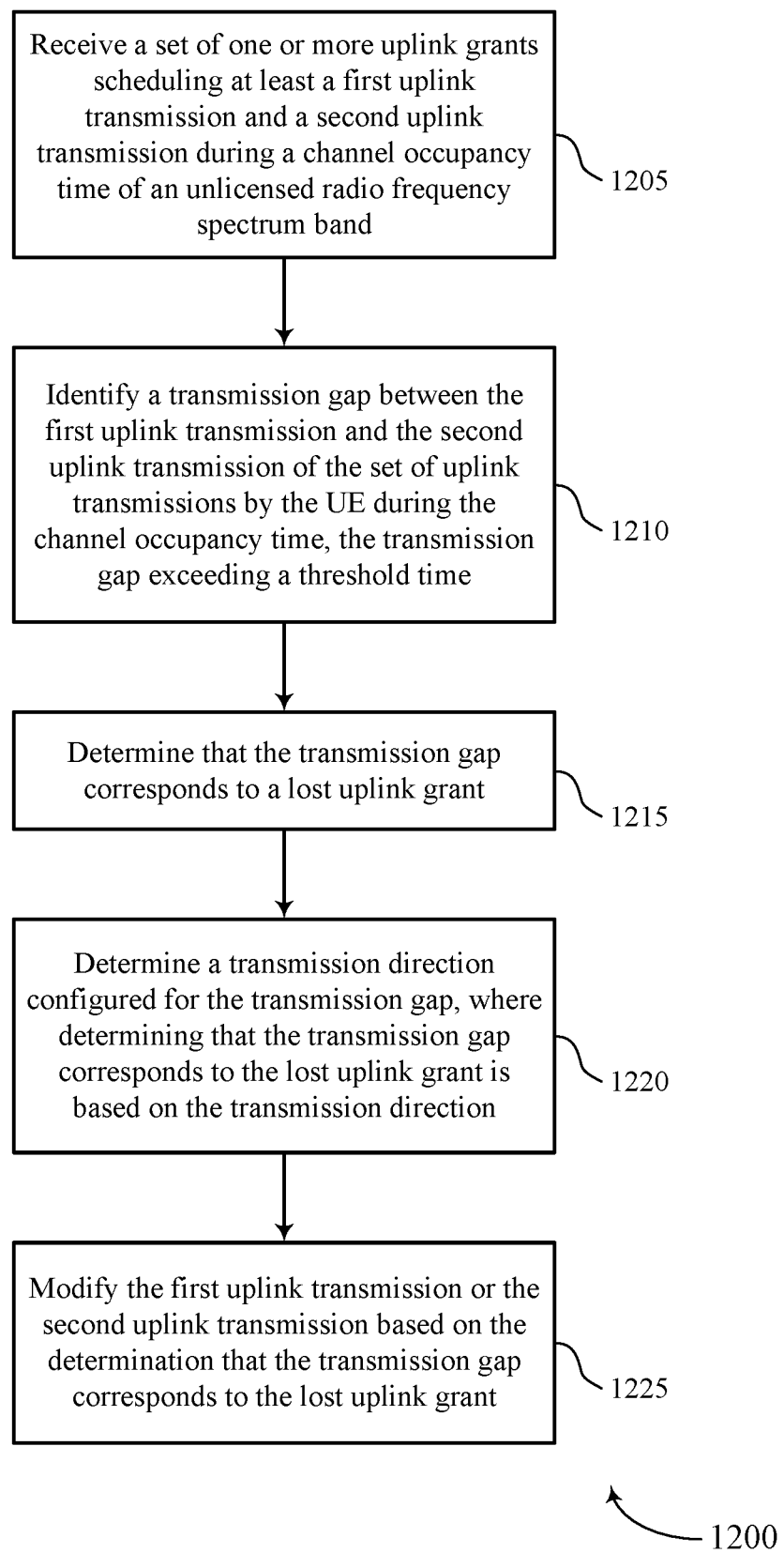

FIG. 12 shows a flowchart illustrating a method 1200 that supports handling gaps in uplink transmission in NR-U in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive a set of one or more uplink grants scheduling at least a first uplink transmission and a second uplink transmission during a channel occupancy time of an unlicensed radio frequency spectrum band. The operations of 1205 may be performed according to the methods described herein. In some examples, aspects of the operations of 1205 may be performed by an uplink grant manager as described with reference to FIGS. 6 through 9.

At 1210, the UE may identify a transmission gap between the first uplink transmission and the second uplink transmission of the set of uplink transmissions by the UE during the channel occupancy time, the transmission gap exceeding a threshold time. The operations of 1210 may be performed according to the methods described herein. In some examples, aspects of the operations of 1210 may be performed by a transmission gap manager as described with reference to FIGS. 6 through 9.

At 1215, the UE may determine that the transmission gap corresponds to a lost uplink grant. The operations of 1215 may be performed according to the methods described herein. In some examples, aspects of the operations of 1215 may be performed by a transmission gap manager as described with reference to FIGS. 6 through 9.

At 1220, the UE may determine a transmission direction configured for the transmission gap, where determining that the transmission gap corresponds to the lost uplink grant is based on the transmission direction. The operations of 1220 may be performed according to the methods described herein. In some examples, aspects of the operations of 1220 may be performed by a SFI manager as described with reference to FIGS. 6 through 9.

At 1225, the UE may modify the first uplink transmission or the second uplink transmission based on the determination that the transmission gap corresponds to the lost uplink grant. The operations of 1225 may be performed according to the methods described herein. In some examples, aspects of the operations of 1225 may be performed by a transmission modification manager as described with reference to FIGS. 6 through 9.

Figure 13:
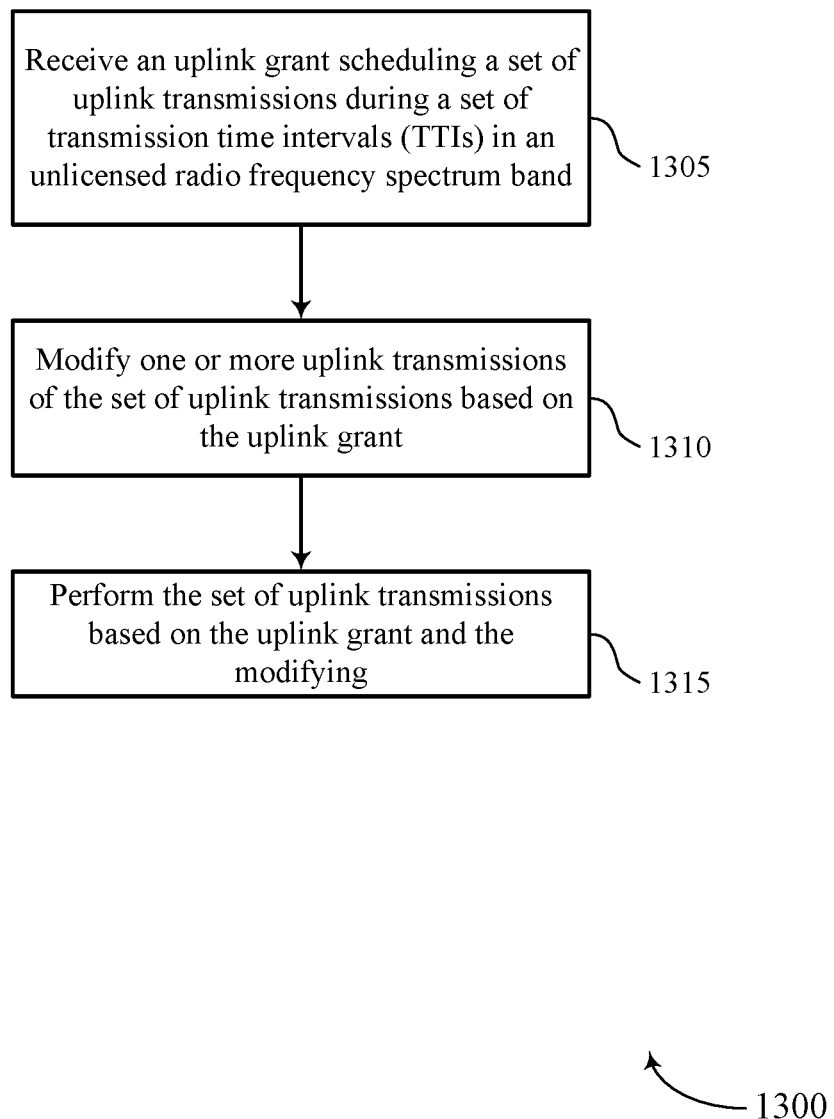

FIG. 13 shows a flowchart illustrating a method 1300 that supports handling gaps in uplink transmission in NR-U in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive an uplink grant scheduling a set of uplink transmissions during a set of TTIs in an unlicensed radio frequency spectrum band. The operations of 1305 may be performed according to the methods described herein. In some examples, aspects of the operations of 1305 may be performed by an uplink grant manager as described with reference to FIGS. 6 through 9.

At 1310, the UE may modify one or more uplink transmissions of the set of uplink transmissions based on the uplink grant. The operations of 1310 may be performed according to the methods described herein. In some examples, aspects of the operations of 1310 may be performed by a transmission modification manager as described with reference to FIGS. 6 through 9.

At 1315, the UE may perform the set of uplink transmissions based on the uplink grant and the modifying. The operations of 1315 may be performed according to the methods described herein. In some examples, aspects of the operations of 1315 may be performed by a transmission modification manager as described with reference to FIGS. 6 through 9.

Figure 14:
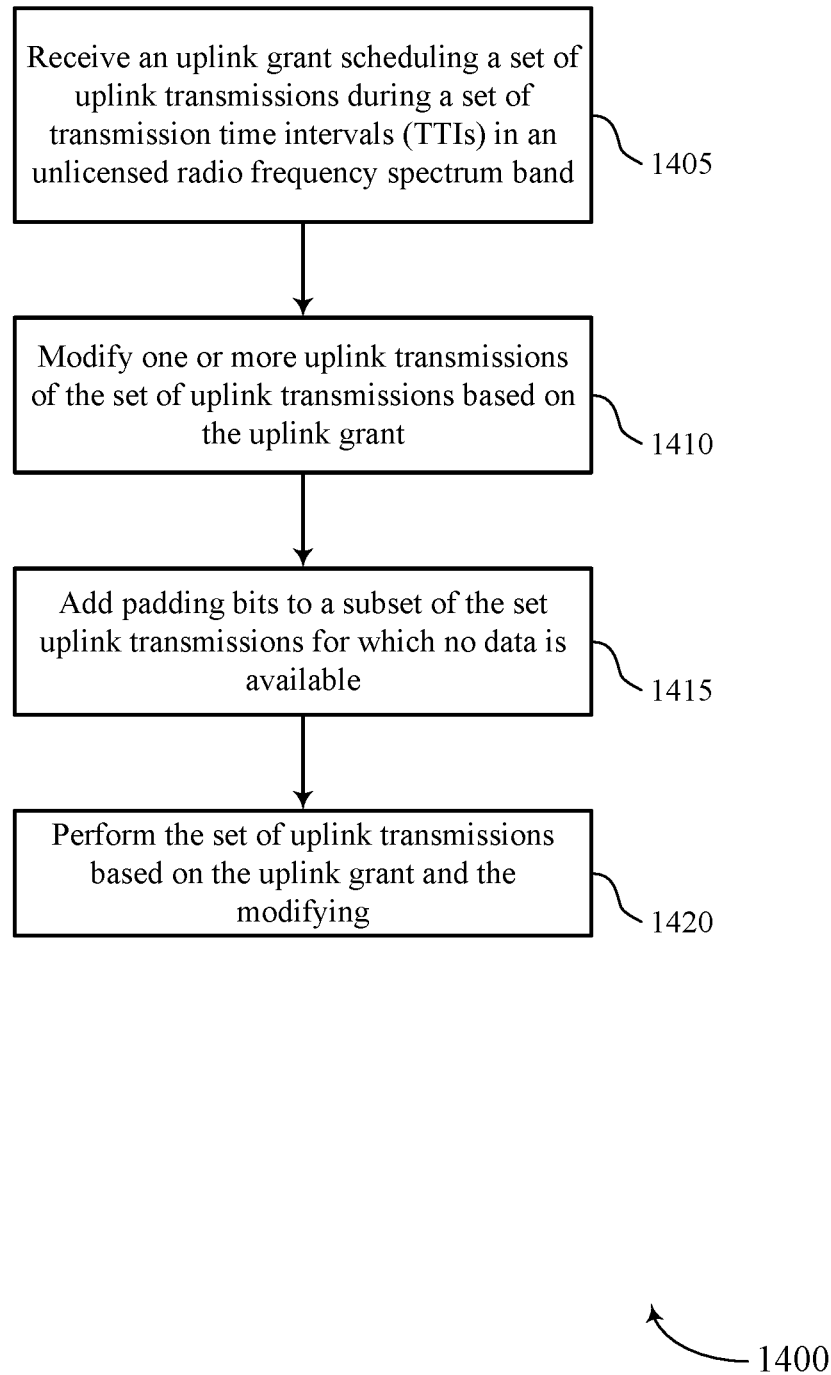

FIG. 14 shows a flowchart illustrating a method 1400 that supports handling gaps in uplink transmission in NR-U in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive an uplink grant scheduling a set of uplink transmissions during a set of TTIs in an unlicensed radio frequency spectrum band. The operations of 1405 may be performed according to the methods described herein. In some examples, aspects of the operations of 1405 may be performed by an uplink grant manager as described with reference to FIGS. 6 through 9.

At 1410, the UE may modify one or more uplink transmissions of the set of uplink transmissions based on the uplink grant. The operations of 1410 may be performed according to the methods described herein. In some examples, aspects of the operations of 1410 may be performed by a transmission modification manager as described with reference to FIGS. 6 through 9.

At 1415, the UE may add padding bits to a subset of the set uplink transmissions for which no data is available. The operations of 1415 may be performed according to the methods described herein. In some examples, aspects of the operations of 1415 may be performed by a padding bit manager as described with reference to FIGS. 6 through 9.

At 1420, the UE may perform the set of uplink transmissions based on the uplink grant and the modifying. The operations of 1420 may be performed according to the methods described herein. In some examples, aspects of the operations of 1420 may be performed by a transmission modification manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an uplink grant scheduling a plurality of uplink transmissions during a plurality of transmission time intervals (TTIs) in an unlicensed radio frequency spectrum band;
   modifying, based at least in part on the uplink grant, one or more uplink transmissions of the plurality of uplink transmissions by reordering the one or more uplink transmissions of the plurality of uplink transmissions; and
   performing the plurality of uplink transmissions based at least in part on the uplink grant and the modifying.

2. The method of claim 1, wherein the reordering the one or more uplink transmissions comprises scheduling uplink retransmissions before scheduling new uplink transmissions.

3. The method of claim 1, wherein modifying the one or more uplink transmissions comprises:
   adding padding bits to a subset of the plurality of uplink transmissions for which no data is available.

4. The method of claim 1, wherein modifying the one or more uplink transmissions comprises:
   adding padding bits to each of the plurality of uplink transmissions that are associated with the an empty uplink buffer status.

5. The method of claim 1, wherein modifying the one or more uplink transmissions comprises:
   determining, based at least in part on the uplink grant, that the plurality of uplink transmissions are configured for skipping; and
   skipping one or more uplink transmissions associated with a transmission gap of the plurality of uplink transmissions.

6. The method of claim 1, wherein modifying the one or more uplink transmissions comprises:
   detecting, based at least in part on the uplink grant and an uplink buffer status, a transmission gap associated with a lost uplink grant in the plurality of TTIs; and
   performing a full listen-before-talk procedure before an uplink transmission following the transmission gap based at least in part on the determination that the transmission gap corresponds to the lost uplink grant.

7. The method of claim 1, wherein modifying the one or more uplink transmissions comprises:
   detecting, based at least in part on the uplink grant and an uplink buffer status, a transmission gap in the plurality of TTIs;
   determining that a duration of the transmission gap is within a threshold range; and
   performing, based at least in part on the duration being within the threshold range, a short listen-before-talk procedure before an uplink transmission following the transmission gap.

8. The method of claim 1, wherein modifying the one or more uplink transmissions comprises:
   detecting, based at least in part on the uplink grant and an uplink buffer status, a transmission gap in the plurality of TTIs; and
   performing a short listen-before-talk procedure before an uplink transmission following the transmission gap based at least in part on the uplink grant configuring the short listen-before-talk procedure or on the uplink transmission being performed during a channel occupancy time associated with the plurality of TTIs.

9. An apparatus for wireless communication at a user equipment (UE), comprising: a processor, memory coupled with the processor; and instructions stored in the memory and executable by the processor to cause the apparatus to:
   receive an uplink grant scheduling a plurality of uplink transmissions during a plurality of transmission time intervals (TTIs) in an unlicensed radio frequency spectrum band;

modify, based at least in part on the uplink grant, one or more uplink transmissions of the plurality of uplink transmissions by reordering the plurality of uplink transmissions; and perform the plurality of uplink transmissions based at least in part on the uplink grant and the modifying.

10. The apparatus of claim 9, wherein the instructions to reorder the one or more uplink transmissions are executable by the processor to cause the apparatus to:

schedule uplink retransmissions before scheduling new uplink transmissions.

11. The apparatus of claim 9, wherein the instructions to modify the one or more uplink transmissions are executable by the processor to cause the apparatus to:

add padding bits to a subset of the plurality of uplink transmissions for which no data is available.

12. The apparatus of claim 9, wherein the instructions to modify the one or more uplink transmissions are executable by the processor to cause the apparatus to:

add padding bits to each of the plurality of uplink transmissions that are associated with the an empty uplink buffer status.

13. The apparatus of claim 9, wherein the instructions to modify the one or more uplink transmissions are executable by the processor to cause the apparatus to:

determine, based at least in part on the uplink grant, that the plurality of uplink transmissions are configured for skipping; and skip one or more uplink transmissions that are associated with a transmission gap of the plurality of uplink transmissions.

14. The apparatus of claim 9, wherein the instructions to modify the one or more uplink transmissions are executable by the processor to cause the apparatus to:

detect, based at least in part on the uplink grant and an uplink buffer status, a transmission gap associated with a lost uplink grant in the plurality of TTIs; and perform a full listen-before-talk procedure before an uplink transmission following the transmission gap based at least in part on the determination that the transmission gap corresponds to the lost uplink grant.

15. The apparatus of claim 9, wherein the instructions to modify the one or more uplink transmissions are executable by the processor to cause the apparatus to:

detect, based at least in part on the uplink grant and an uplink buffer status, a transmission gap in the plurality of TTIs;

determine that a duration of the transmission gap is within a threshold range; and perform, based at least in part on the duration being within the threshold range, a short listen-before-talk procedure before an uplink transmission following the transmission gap.

16. The apparatus of claim 9, wherein the instructions to modify the one or more uplink transmissions are executable by the processor to cause the apparatus to:

detect, based at least in part on the uplink grant and an uplink buffer status, a transmission gap in the plurality of TTIs; and perform a short listen-before-talk procedure before an uplink transmission following the transmission gap based at least in part on the uplink grant configuring the short listen-before-talk procedure or on the uplink transmission being performed during a channel occupancy time associated with the plurality of TTIs.

* * * * *